United States Patent
Song et al.

(10) Patent No.: US 9,616,328 B2
(45) Date of Patent: Apr. 11, 2017

(54) VIRTUAL GOLF SIMULATION APPARATUS FOR PROVIDING USER-CUSTOMIZED PRACTICE ENVIRONMENT, SERVER CONNECTED WITH THE SAME THROUGH NETWORK, AND USER-CUSTOMIZED PRACTICE ENVIRONMENT PROVISION METHOD USING VIRTUAL GOLF SIMULATION

(75) Inventors: Jae Soon Song, Gwangju-si (KR); Seong In Cho, Incheon (KR); Sung Young Im, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 638 days.

(21) Appl. No.: 14/127,974

(22) PCT Filed: Jun. 22, 2012

(86) PCT No.: PCT/KR2012/004948
§ 371 (c)(1),
(2), (4) Date: Dec. 20, 2013

(87) PCT Pub. No.: WO2012/177077
PCT Pub. Date: Dec. 27, 2012

(65) Prior Publication Data
US 2014/0120994 A1 May 1, 2014

(30) Foreign Application Priority Data

Jun. 22, 2011 (KR) .......................... 10-2011-0060819
Jun. 22, 2011 (KR) .......................... 10-2011-0060820

(51) Int. Cl.
*A63F 13/00* (2014.01)
*A63F 9/24* (2006.01)
(Continued)

(52) U.S. Cl.
CPC ............ *A63F 13/005* (2013.01); *A63B 67/02* (2013.01); *A63B 69/36* (2013.01); *A63F 13/573* (2014.09);
(Continued)

(58) Field of Classification Search
None
See application file for complete search history.

(56) References Cited

U.S. PATENT DOCUMENTS 3,712,624 A * 1/1973 Conklin ................. A63B 69/36
473/152
7,789,742 B1 * 9/2010 Murdock ............... A63B 67/02
273/108
(Continued)

FOREIGN PATENT DOCUMENTS

KR        10-0819564 B1    4/2008
KR   10-2010-0027344 A    3/2010
(Continued)

*Primary Examiner* — Lawrence Galka
(74) *Attorney, Agent, or Firm* — Revolution IP, PLLC

(57) ABSTRACT

Disclosed herein are a virtual golf simulation apparatus for providing a user-customized practice environment, a server connected with the virtual golf simulation apparatus through a network, and a user-customized practice environment provision method using the virtual golf simulation, which are capable of providing various practice modes for each golf shot so that a user can practice a specific golf shot intensively using golf simulation based on virtual reality to realize a virtual environment that cannot be experienced on a real golf driving range so that the user can intensively practice a golf shot which is more exciting, more intensive, and more practically useful in a real game.

18 Claims, 21 Drawing Sheets

(51) Int. Cl.
  *A63B 67/02* (2006.01)
  *A63F 13/573* (2014.01)
  *A63B 69/36* (2006.01)
  *A63F 13/812* (2014.01)
  *G06Q 30/00* (2012.01)
  *G06Q 50/10* (2012.01)

(52) U.S. Cl.
  CPC .......... *A63F 13/812* (2014.09); *G06Q 30/00* (2013.01); *G06Q 50/10* (2013.01)

(56) References Cited

U.S. PATENT DOCUMENTS

| | | | | |
|---|---|---|---|---|
| 2003/0078086 A1* | 4/2003 | Matsuyama | .......... | A63F 13/573 463/3 |
| 2006/0063574 A1* | 3/2006 | Richardson | .......... | A63F 13/573 463/1 |
| 2006/0166737 A1* | 7/2006 | Bentley | ................. | A63F 13/812 463/30 |
| 2011/0250939 A1* | 10/2011 | Hobler | ................. | A63F 13/812 463/7 |
| 2011/0273562 A1* | 11/2011 | Dawe | ..................... | A63B 69/36 348/139 |
| 2012/0184340 A1* | 7/2012 | Jang | ....................... | A63B 67/02 463/2 |
| 2013/0041487 A1* | 2/2013 | Messner | ................ | A63B 69/36 700/91 |

FOREIGN PATENT DOCUMENTS

| KR | 10-0970675 B1 | 7/2010 |
|---|---|---|
| KR | 10-2011-0040257 A | 4/2011 |
| WO | WO 2011-065802 A2 | 6/2011 |

* cited by examiner

FIG. 8

| Mr./Ms. BULGOGUMI | | GDR Total practice time(h) | 32,869 | Total number of practice balls (ea) | 1,538,234 |

<Record of 10 recent golf practices>

| Mode usage ratio(%) | Driving Range | Short Game | Challenge Mode | Mini Round |
|---|---|---|---|---|
| | 45% | 20% | 20% | 15% |

Driving Range

| | W1 | W3 | W4 | W5 | ... | I6 | I7 | I8 | I9 |
|---|---|---|---|---|---|---|---|---|---|
| Straight probability(%) | 80 | 53 | 74 | 41 | ... | 39 | 82 | 67 | 75 |
| Target location rate(%) | | | | | | | | | |
| Flight distance(m) | | | | | | | | | |
| Carry(m) | | | | | | | | | |
| Ball speed(m/s) | | | | | | | | | |
| Club head speed(m/s) | | | | | | | | | |
| Smash factor | | | | | | | | | |
| Backspin(rpm) | | | | | | | | | |
| Launch angle (Deg) | | | | | | | | | |
| Ball height(m) | | | | | | | | | |
| Ball action | 80 | +53 | −84 | | | | | | |

LS

Short Game

| | 20 | 30 | 40 | 50 | ... | 100 | 110 | 120 | 130 |
|---|---|---|---|---|---|---|---|---|---|
| Target location rate(%) | | | | | | | | | |
| Flight distance(m) | | | | | | | | | |
| Carry(m) | | | | | | | | | |
| Backspin(rpm) | | | | | | | | | |
| Sidespin(rpm) | | | | | | | | | |
| Launch angle (Deg) | | | | | | | | | |
| Ball height(m) | | | | | | | | | |

SS

[CUSTOMIZED PROPOSAL] [EXIT]

FIG. 11

<Result of customized proposal>

BULGOGUMI

| | Driving Range | Short Game |
|---|---|---|
| Practice time(m) | 15 | 15 |
| Number of practice balls (ea) | 60 | 40 |

Driving Range

| | W3 | | W4 | | 18 | | 19 | |
|---|---|---|---|---|---|---|---|---|
| | tod.. | ave.. | tod.. | ave.. | tod.. | ave.. | tod.. | ave.. |
| Straight probability(%) | 54 | 60 | 68 | 62 | | | | |
| Target location rate(%) | 24 | 25 | 32 | 30 | | | | |
| Flight distance(m) | 135 | 125 | 130 | 123 | | | | |
| Carry(m) | 132 | 120 | 127 | 120 | | | | |
| Ball speed(m/s) | 67 | 65 | 70 | 65 | | | | |
| Club head speed(m/s) | 64 | 65 | 60 | 65 | | | | |
| Smash factor | 1 | 1 | 1.1 | 1 | | | | |
| Backspin(rpm) | | | | | | | | |
| Launch angle (Deg) | 33 | 32 | 34 | 35 | | | | |
| Ball height(m) | 80 | 48 | | | | | | |
| Ball action | -55 | | +82 | | | | | |

Short Game

| | 30 | | 40 | | 60 | | 100 | |
|---|---|---|---|---|---|---|---|---|
| | tod.. | ave.. | tod.. | ave.. | tod.. | ave.. | tod.. | ave.. |
| Target location rate(%) | 70 | 50 | 70 | 55 | | | | |
| Flight distance(m) | 35 | 39 | 49 | 52 | | | | |
| Carry(m) | 33 | 32 | 45 | 47 | | | | |
| Backspin(rpm) | 870 | 900 | 880 | 890 | | | | |
| Sidespin(rpm) | 300 | 500 | 320 | 520 | | | | |
| Launch angle (Deg) | 65 | 67 | 62 | 65 | | | | |
| Ball height(m) | | | | | | | | |

CUSTOMIZED PROPOSAL    EXIT

FIG. 19

| Club | Average flight distance(m) | Average direction angle (Deg) | Average left and right distance(m) | Average launch angle (Deg) |
|---|---|---|---|---|
| 17 | 140 | 5.7  6.2 | 15.7  16.2 | 18.7 |

| | Shot1 | Shot2 | Shot3 | Shot4 | Shot5 |
|---|---|---|---|---|---|
| Flight distance(m) | 140.6 | (110.1) | 135.9 | 143.7 | (180.8) |
| Carry(m) | 130.6 | 100.1 | 125.9 | 133.7 | 170.8 |
| Ball speed(m/s) | 40.6 | 10.1 | 35.9 | 43.7 | 80.8 |
| Club head speed(m/s) | 30.6 | 6.1 | 25.9 | 33.7 | 60.8 |
| Smash Fator | 1.31 | 1.62 | 1.44 | 1.42 | 1.48 |
| Backspin(rpm) | 140.6 | 110.1 | 135.9 | 143.7 | 180.8 |
| Sidespin(rpm) | 140.6 | 110.1 | 135.9 | 143.7 | 180.8 |
| Ball height(m) | 32 | 24 | 37 | 30 | 29 |
| Direction angle (Deg) | (-16.9) | -3.2 | 6.9 | 5.4 | 6.2 |
| Left and right distance(m) | 17.1 | -7.3 | (46.8) | -15.5 | 10.9 |
| Launch angle (Deg) | 17.5 | 19.6 | 16.3 | (4.1) | 20.2 |
| | Swing motion 1 | Swing motion 2 | Swing motion 3 | Swing motion 4 | Swing motion 5 |

ENTER

FIG. 20

| | Practice distance(m) | Nice shot distance(m) |
|---|---|---|
| | 50 | 5 |

| | Shot1 | Shot2 | Shot3 | Shot4 | Shot5 |
|---|---|---|---|---|---|
| Club | S/W | S/W | S/W | S/W | S/W |
| Flight distance(m) | 32.8 | 69.2 | 34.1 | 35.3 | 66.2 |
| Carry(m) | 22.5 | 58.2 | 24.1 | 25.3 | 56.2 |
| Remaining distance(m) | 21.1 | 19.2 | 17.3 | 16.9 | 18.5 |
| Backspin(rpm) | 140.6 | 110.1 | 135.9 | 143.7 | 180.8 |
| Sidespin(rpm) | -140.6 | 110.1 | -135.9 | -143.7 | 180.8 |
| Ball height(m) | 32 | 24 | 37 | 30 | 29 |
| Launch angle (Deg) | 22.5 | 25.6 | 16.3 | 24.1 | 20.2 |
| Direction angle (Deg) | 3.7 | -2.6 | -5.9 | 4.7 | 6.2 |
| | Swing motion 1 | Swing motion 2 | Swing motion 3 | Swing motion 4 | Swing motion 5 |

ENTER

VIRTUAL GOLF SIMULATION APPARATUS FOR PROVIDING USER-CUSTOMIZED PRACTICE ENVIRONMENT, SERVER CONNECTED WITH THE SAME THROUGH NETWORK, AND USER-CUSTOMIZED PRACTICE ENVIRONMENT PROVISION METHOD USING VIRTUAL GOLF SIMULATION

CROSS REFERENCE TO PRIOR APPLICATIONS

This application is a National Stage Application of PCT International Patent Application No. PCT/KR2012/004948 filed on Jun. 22, 2012, under 35 U.S.C. §371, which claims priority to Korean Patent Application Nos. 10-2011-0060819 filed on Jun. 22, 2011, and 10-2011-0060820 filed on Jun. 22, 2011, which are all hereby incorporated by reference in their entirety.

TECHNICAL FIELD

The present invention relates to a virtual golf simulation apparatus for providing a user-customized practice environment, a server connected with the virtual golf simulation apparatus through a network, and a user-customized practice environment provision method using virtual golf simulation, and, more particularly, to a virtual golf simulation apparatus that enables a user to practice golf professionally under a virtual environment for golf practice using a method of sensing a golf ball hit by a user to simulate the trajectory of the ball, a server connected with the virtual golf simulation apparatus for providing preset information, and a user-customized practice environment provision method using virtual golf simulation.

BACKGROUND ART

With the recent upsurge of the golfing population, a so-called screen golf system using a virtual golf simulation apparatus based on virtual reality to obtain the same sense of reality that a golfer would play a round of golf on a real golf course has gained popularity.

The screen golf system senses the velocity and direction of a golf ball that a golfer hits onto a screen installed indoors for displaying a virtual golf range and displays the progress of the golf ball on the screen so that the golfer feels as if they were playing a round of golf on a real golf course.

The virtual golf simulation apparatus enables a user to play a round of virtual golf so that the user can improve his/her skill when playing a round of golf on a real golf course.

However, golf is a hard sport in which it is necessary to take various golf shots using various golf clubs depending upon the distance to a hole cup. For this reason, the user must skillfully take almost all kinds of golf shots during a round of golf so as to get a good score. As long as the user is not a professional, however, some kinds of golf shots taken by the user may be poor, and the conventional virtual golf simulation apparatus is limited for the user to intensively practice his/her poor golf shots.

The user must practice a specific golf shot on a real golf driving range so as to intensively practice the golf shot. However, practice of the golf shot on the real golf driving range is too tiresome to stimulate the user's interest with the result that improvement in golf skill of the user is very slow.

Therefore, there is a high necessity for a new golf practice apparatus concept that is capable of enabling a specific golf shot, which is possible only on a real golf driving range, to be intensively practiced through golf simulation based on virtual reality and providing various functions, which cannot be provided on the real golf driving range, to improve golf skill of a user based on golf simulation using various high-technology apparatuses and systems.

DISCLOSURE OF INVENTION

Technical Problem

Therefore, it is an object of the present invention to provide a virtual golf simulation apparatus for providing a user-customized practice environment, a server connected with the virtual golf simulation apparatus through a network, and a user-customized practice environment provision method using virtual golf simulation according to the present invention, which are capable of providing various practice modes for each golf shot so that a user can practice a specific golf shot intensively using golf simulation based on virtual reality to realize a virtual environment that cannot be experienced on a real golf driving range so that the user can intensively practice a golf shot which is more exciting, more intensive, and more practically useful in a real game, in particular, analyzing the record regarding the result of the golf practice performed by the user to set a customized practice curriculum for intensively strengthening user weaknesses, and realizing a virtual environment in which the user can perform golf practice through virtual golf simulation according to the set practice curriculum or providing customized lesson content to the user, thereby greatly improving golf skill of the user.

Solution to Problem

In accordance with one aspect of the present invention, the above and other objects can be accomplished by the provision of a virtual golf simulation apparatus for providing a user-customized practice environment, including a simulation means for realizing a virtual environment regarding each of a plurality of practice modes preset so that a user can perform golf practice for each kind of golf shot and simulating a trajectory of a ball according to the golf shot taken by the user in the realized virtual environment and a set environment control means for controlling the virtual environment so that the user can practice the golf shot according to a set condition in a practice mode set according to practice curriculum setting information for the user set based on an analysis result of a record regarding a result of golf practice performed by the user.

In accordance with another aspect of the present invention, there is provided a server connected with a virtual golf simulation apparatus for realizing a virtual environment regarding each of a plurality of practice modes preset so that a user can practice a golf shot intensively for each kind of golf shot and simulating a trajectory of a ball according to a sensing result of at least one of a golf club and the ball according to a golf swing performed by the user in the realized virtual environment through a network, the server including a database for storing information regarding users registered in the server and a processor for setting items regarding a practice mode and a practice condition in which the user will practice a golf shot based on a record analysis result according to a result of golf practice performed by the user through the virtual golf simulation apparatus to generate practice curriculum setting information and transmitting the generated practice curriculum setting information to the virtual golf simulation apparatus.

In accordance with a further aspect of the present invention, there is provided a user-customized practice environment provision method using virtual golf simulation, including extracting a record regarding a result of golf practice performed by a user and analyzing the record through a virtual golf simulation apparatus for realizing a virtual environment regarding each of a plurality of practice modes preset so that the user can practice a golf shot intensively for each kind of golf shot, setting items regarding a practice mode and a practice condition in which the user will practice a golf shot based on the analysis result of the record to generate a practice curriculum setting information for the user, and controlling a virtual golf simulation environment so that the user can practice the golf shot according to a set condition in a practice mode set according to the practice curriculum setting information.

Advantageous Effects of Invention

In a virtual golf simulation apparatus for providing a user-customized practice environment, a server connected with the virtual golf simulation apparatus through a network, and a user-customized practice environment provision method using virtual golf simulation according to the present invention, it is possible to provide various practice modes for each golf shot so that a user can practice a specific golf shot intensively using golf simulation based on virtual reality to realize a virtual environment that cannot be experienced on a real golf driving range so that the user can intensively practice a golf shot which is more exciting, more intensive, and more practically useful in a real game, in particular, to analyze the record regarding the result of the golf practice performed by the user to set a customized practice curriculum for intensively strengthening user weaknesses, and to realize a virtual environment in which the user can perform golf practice through virtual golf simulation according to the set practice curriculum or to provide customized lesson content to the user, thereby greatly improving golf skill of the user.

BRIEF DESCRIPTION OF DRAWINGS

The above and other objects, features and other advantages of the present invention will be more clearly understood from the following detailed description taken in conjunction with the accompanying drawings, in which:

FIG. 8 is a view showing an example of results of golf practice performed by a user through the virtual golf simulation apparatus according to the present invention;

FIG. 11 is a view showing an example of results of golf practice in a customized practice environment according to practice curriculum setting information regarding a user;

FIGS. 19 to 22 are views showing details of shot analysis performed by a shot analysis means of the golf simulation apparatus according to the embodiment of the present invention and an example of user-customized lesson content provided by a customized lesson provision means.

BEST MODE FOR CARRYING OUT THE INVENTION

Now, exemplary embodiments of a virtual golf simulation apparatus for providing a user-customized practice environment, a server connected with the virtual golf simulation apparatus through a network, and a user-customized practice environment provision method using virtual golf simulation according to the present invention will be described in detail with reference to the accompanying drawings.

Figure 1:
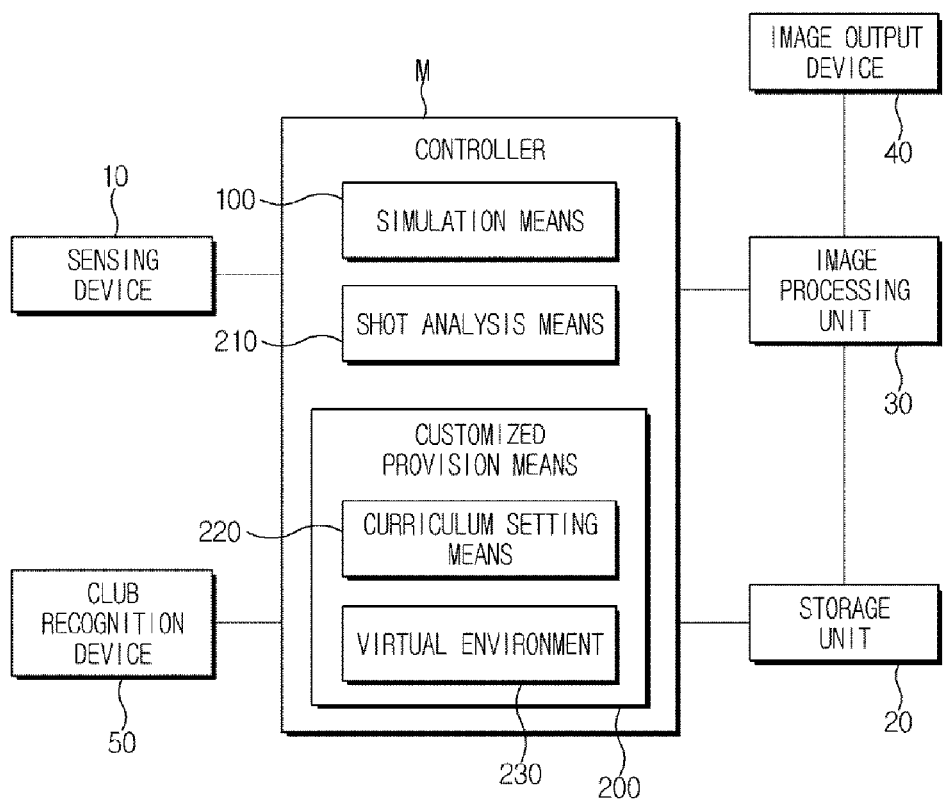
FIGS. 1 to 3 are block diagrams showing the constructions of various embodiments of a virtual golf simulation apparatus for providing a user-customized practice environment according to the present invention.

First, a virtual golf simulation apparatus according to an embodiment of the present invention will be described in detail with reference to FIG. 1. FIG. 1 is a block diagram showing the construction of a virtual golf simulation apparatus for providing a user-customized practice environment according to an embodiment of the present invention.

As shown in FIG. 1, the virtual golf simulation apparatus according to the embodiment of the present invention may include a sensing device 10, a storage unit 20, an image realization means 30, and 40, a club recognition device 50, and a controller M.

Basically, the virtual golf simulation apparatus according to the present invention realizes a virtual environment for allowing a user to perform golf practice on a golf driving range and simulates a golf shot taken by the user so that the user can evaluate his/her own golf shot.

The golf driving range realized by the present invention is a 'virtual golf driving range' on which a virtual environment that cannot be experienced on a real golf driving range is realized so that a user can practice a golf shot which is more exciting, more intensive, and more practically useful in a real game.

The virtual environment regarding the virtual golf driving range is realized by the controller M through the image realization means 30 and 40 using data obtained from the storage unit 20. In the virtual environment realized as described above, a golf club which a user uses to take a golf shot is recognized by the club recognition device 50. When the user takes a golf shot, the sensing device 10 senses the golf shot taken by the user. At this time, the simulation means 100 of the controller M calculates a trajectory of the ball based on the result sensed by the sensing device 10 and the recognized club information so that the ball can be simulated in the realized virtual environment.

Hereinafter, the respective components of the virtual golf simulation apparatus to realize the above-mentioned characteristics will be described in more detail.

The sensing device 10 senses the motion of a golf club and/or a ball according to a golf swing performed by a user. The sensing device 10 may be realized in various forms. For example, the sensing device 10 may be realized by an infrared sensor which emits infrared light, receives an infrared light component reflected by a golf club head moved when a user hits a ball and the ball hit by the user, and analyzes the received infrared light component, a laser sensor which irradiates a laser, senses a laser component blocked by a golf club head moved when a user hits a ball and the ball hit by the user, and analyzes the sensed laser component, or an image sensor which collects images regarding a ball hit by a user as the result of a golf swing and analyzes the collected images.

Meanwhile, the storage unit 20 stores all data necessary for virtual golf simulation. For example, the storage unit 20 stores data necessary to realize a virtual environment in which a user can practice a golf shot according to a specific one of various golf practice modes. In particular, the storage unit 20 stores data necessary to provide a virtual environment set so that a user can practice a golf shot according to a set condition in a practice mode set according to practice curriculum setting information, which will be described below.

Also, the storage unit 20 may store personal information of users registered in the system or previous record information of the respective users.

Meanwhile, the image realization means is configured to realize a virtual environment regarding each of a plurality of practice modes preset so that a user can practice a golf shot intensively for each kind of golf shot. As shown in FIG. 1, the image realization means may include an image processing unit 30 and an image output device 40.

The image processing unit 30 extracts data regarding image information regarding a virtual environment in which a user can practice a specific golf shot from the storage unit 20, processes the data as an image so that the data can be output as the image, and transmits the image-processed data to the image output device 40. The image output device 40 receives the data regarding image information and outputs the received data as an image so that a user can view the image.

That is, the controller M sets a virtual environment in which a user can practice a specific golf shot based on a practice mode selected by the user, image-processes the set virtual environment through the image processing unit 30, and outputs the image-processed virtual environment as an image through the image output device 40.

The image processing unit 30 may be realized as a modulated part for performing an image processing function in an independent apparatus or may be realized as an independent apparatus.

The image output device 40 may be realized as a display device or as a projector for projecting an image onto a screen to display the image.

The club recognition device 50 is provided to recognize information regarding a golf club held by a user when the user stands on a hitting plate while holding the golf club to take a golf shot.

The club recognition device 50 may be realized in various forms. For example, the club recognition device 50 may be realized as a radio frequency identification (RFID) reader, which is configured such that, when a user stands on a hitting plate in a state in which an RFID tag containing information regarding a golf club is attached to the golf club, the RFID reader (club recognition device) installed near the hitting plate reads the RFID tag attached to the golf club held by the user for receiving information regarding the golf club to recognize the golf club.

Also, the club recognition device 50 may be realized as a barcode reader for reading a barcode or a quick response (QR) reader for reading a QR code. A barcode or a QR code containing information regarding a golf club is attached to the golf club, and the barcode reader or the QR reader installed near the hitting plate reads the barcode or the QR code to recognize the golf club.

Also, the club recognition device 50 may be realized as a camera device. A mark regarding a golf club is formed at the golf club, and the camera device acquires an image regarding the golf club and recognizes the mark regarding the golf club to recognize the golf club.

Information regarding the golf club recognized by the club recognition device 50 and the result sensed by the sensing device 10 are processed by the simulation means 100. The processed result may be used to more accurately calculate the trajectory of the ball, to determine whether the golf club is suitable for the practice mode selected by the user, or to recognize what kind of golf club is used by the user so that a virtual environment is realized based on a position at which a golf shot can be taken using the golf club.

Meanwhile, the controller M is a component for controlling the virtual golf simulation apparatus. The controller M presets a plurality of practice modes so that a user can practice a golf shot intensively for each kind of golf shot, and controls the image processing unit 30 and the image output device 40 so that a virtual environment corresponding to a selected practice mode can be realized as an image.

The controller M presets a plurality of practice modes for each kind of golf shot. For example, the controller M sets a long game practice mode to intensively practice at least one golf shot selected from among a driver shot, a wood shot, and an iron shot and a short game practice mode to intensively practice an approach shot and/or putting. The controller M realizes a virtual environment in which a golf shot can be taken based on each practice mode.

Although the controller M defines and sets the practice modes, such as the long game practice mode and the short game practice mode, based on kinds of golf shots as described above, the controller M may also define and set a driver practice mode to practice a driver shot, a wood practice mode to practice a wood shot, an iron practice mode to practice an iron shot, a pitch practice mode to practice a pitch shot, a chip practice mode to practice a chip shot, and putting practice mode to practice putting.

Also, the controller M may set a real game practice mode in which a golf shot practiced in a different practice mode is practiced on at least one virtual hole as in a real game and a mission execution mode in which a goal is achieved step by step with respect to some kinds of golf shots and may realize a virtual environment based on each of the set modes.

Meanwhile, the controller M may realize a virtual environment in which a golf shot based on each practice mode is taken at a specific position of a specific hole at which the shot can be taken on a virtual golf course (a golf course based on virtual reality including regular 18 holes and configured so that a round of virtual golf can be played using the conventional virtual golf simulation apparatus).

That is, the controller M may set a specific position of a specific virtual golf course selected by a user or according to preset items at which the user can take a golf shot in a practice mode selected by the user or according to preset items and realize a virtual environment regarding the specific virtual golf course so that the user can practice a golf shot at the specific position according to the set items based on the selected practice mode.

For example, when a user plays a round of virtual golf on Pebble Beach Golf Course (a virtual golf course obtained by realizing Pebble Beach Golf Links located at Pebble Beach, Calif., USA in virtual reality) through a so-called screen golf system, a driver shot on hole number 1 may be out of bounds (OB). In order to intensively practice such a driver shot, therefore, the user may select a practice mode to intensively practice a driver shot through the virtual golf simulation apparatus according to the present invention, and may select hole number 1 of Pebble Beach Golf Course as a virtual environment. In this case, the controller M may set a virtual environment in which the user can take a golf shot at a tee shot position of hole number 1 of Pebble Beach Golf Course and realize a virtual environment based on the set items.

Also, when a user plays a round of virtual golf on Pine Valley Golf Club (a virtual golf course obtained by realizing Pine Valley Golf Club located at southern New Jersey, USA in virtual reality) through a so-called screen golf system, an approach shot on hole number 3 may fail. In order to intensively practice such an approach shot, therefore, the user may select a practice mode to intensively practice an approach shot through the virtual golf simulation apparatus according to the present invention, may select hole number 3 of Pine Valley Golf Club as a virtual environment, and may select a specific position of the selected hole number 3 of Pine Valley Golf Club at which an approach shot is to be taken, thereby realizing a virtual environment regarding the vicinity of a green of hole number 3 of Pine Valley Golf Club so that the approach shot can be intensively practiced at the selected position Meanwhile, the controller M of the virtual golf simulation apparatus according to the embodiment of the present invention includes a simulation means 100, a shot analysis means 210, and a customized provision means 200.

The simulation means 100 simulates the trajectory of the ball based on the result sensed by the sensing device 10 in the realized virtual environment. That is, the simulation means 100 receives specific physical information of the ball based on the motion of the golf club and/or the ball sensed by the sensing device 10, calculates the trajectory of the ball based on the received information of the ball, and simulates the calculated trajectory of the ball in the realized virtual environment.

The shot analysis means 210 analyzes the simulation result of the golf shot taken by the user to calculate a record. The shot analysis means 210 analyzes the simulation result of the golf shot taken by the user for each of a plurality of preset analysis items to calculate a record.

That is, the shot analysis means 210 analyzes the simulation result of the golf shot taken by the user. The shot analysis means 210 provides records regarding kind of a practice mode in which the user has practiced a golf shot, practice time for which the user has practiced the golf shot based on the practice mode, kind of golf clubs used when the user has practiced the golf shot, and flight distances for the respective golf clubs. In addition, for example, when the user selects a practice mode for driver shot practice, the shot analysis means 210 analyzes not only a speed of a golf club head when the user has taken a driver shot, a face angle at the time of impact, an impact position of the golf club head, and a swing path, but also statistics of slices, hooks, and flight distances based on the result of a plurality of driver shots, and provides the analysis result.

When the user selects a practice mode for pitch shot practice, the shot analysis means 210 analyzes not only an impact position of a golf club head, a trajectory angle, and a flight distance but also statistics of green location rates and proximity to a hole cup, and provides the analysis result.

Meanwhile, the customized provision means 200 analyzes a record regarding the golf practice result calculated by the shot analysis means 210, sets items regarding a practice mode and a practice condition in which a user will practice a golf shot based on the analysis result to generate practice curriculum setting information, and provides a practice environment in which the user can practice a golf shot according to the generated practice curriculum setting information.

More specifically, the customized provision means 200 includes a curriculum setting means 220 for analyzing a record regarding the golf practice result of the user and setting a practice curriculum regarding a practice mode and a practice condition in which a user will practice a golf shot based on the analysis result to generate practice curriculum setting information and a set environment control means 230 for controlling the image realization means so that the user can practice a golf shot according to the practice curriculum setting information generated by the curriculum setting means 220 to provide a set practice environment.

The curriculum setting means 220 is preferably configured to analyze a record based on the simulation result of the golf shot taken by the user analyzed by the shot analysis means 210 to analyze information constituting a basis for generating practice curriculum setting information for the user. For example, the curriculum setting means 220 may compare a record based on the golf practice result of a specific user with an average record of users having the same skill ranking as the specific user to extract portions of the record of the specific user lower than the average record.

In this way, a practice curriculum is set based on the portions of the record of the specific user lower than the average record to generate practice curriculum setting information.

Meanwhile, the curriculum setting means 220 sets items regarding a practice mode in which a user will practice a golf shot and a practice condition in the practice mode to generate practice curriculum setting information. The practice curriculum setting information is obtained by making a practice curriculum determined as being most suitable for a specific user as the result of analyzing a record based on the result of golf practice performed by the specific user and setting various kinds of information regarding a virtual environment in which the specific user can perform golf practice according to the practice curriculum.

That is, the practice curriculum setting information is necessary to realize a virtual environment in which various items for golf practice are set, and the set items are practiced in due order, as if learning is performed according to a curriculum made regarding a course of study, i.e. a customized practice environment, through the image realization means.

For example, in a case in which, as the result of analysis of a record of golf practice performed by a user through the virtual golf simulation apparatus, a long game record has reached an average value of the skill ranking of the user, a driver shot record has not reached an average value of the skill ranking of the user, and a record of an approach shot within a distance of less than 50 m in a short game record, has not reached an average value of the skill ranking of the user, the curriculum setting means 220 may set a practice curriculum in which golf practice is performed using a number 1 wood for 30 minutes in a long game practice mode, and an approach shot with a distance of 30 m is taken for 15 minutes, an approach shot with a distance of 40 m is taken for 15 minutes, and an approach shot with a distance of 50 m is taken for 15 minutes in a short game practice mode to generate practice curriculum setting information based on which a virtual practice environment for the set practice curriculum is realized.

In the practice curriculum setting information, not only a golf club or a target flight distance but also various practice conditions may be set, which will be described below in more detail.

Meanwhile, based on the practice curriculum setting information generated by the curriculum setting means 220, the set environment control means 230 extracts relevant data from the storage unit 20 and controls the image processing unit 30 to image-process the extracted data and the image output device 40 to output the image-processed data to realize a virtual environment in which a user can practice a golf shot according to the generated practice curriculum setting information.

The set environment control means 230 executes a practice mode selected from among a plurality of practice modes or some practice modes selected from among the plurality of practice modes in set order according to the practice curriculum setting information, and provides a virtual environment in which a user practices a golf shot according to at least one set condition selected from among a set condition regarding practice time, a set condition regarding kind of a golf club to be used for golf practice, and a set condition regarding a practice distance according to the practice curriculum setting information.

Meanwhile, the shot analysis means 210 presets information regarding a determination criterion for determining whether a golf shot taken by a user is good or bad based on the set condition set according to the practice curriculum setting information. Therefore, it is preferable for the shot analysis means 210 to analyze the simulation result of a golf shot taken by the user in the virtual practice environment according to the practice curriculum setting information for the user and to determine whether the golf shot is good or bad according to the determination criterion.

That is, the shot analysis means 210 may not only calculate a record constituting a basis for setting a user practice curriculum but also determine whether, when the user performs golf practice according to the generated practice curriculum setting information, each shot is good or bad.

At this time, the determination criterion for determining whether a golf shot taken by a specific user is good or bad may be based on an average record of users registered in the system, an average record of users having the same skill ranking as the user, the users being sorted by skill ranking, a record arbitrarily set by a specialist, such as a pro golfer, or a record arbitrarily decided by the system.

The shot analysis means 210 may compare a record of the result of a golf shot taken by a user with the record preset as the determination criterion, and, when the difference therebetween deviates from a preset range, may determine that the golf shot is bad.

For example, in a case in which a record of an average flight distance for each golf club in the skill ranking of the user is preset as the determination criterion, when a flight distance of a golf shot taken by a user using a specific golf club is 10% longer or shorter than the preset average flight distance of the golf club, the shot analysis means 210 may determine that the golf shot is bad.

Also, in a case in which a record of an average left/right direction angle for each golf club in the skill ranking of the user is preset as the determination criterion, when an average direction angle of golf shots taken by a user using a specific golf club is twice or more the preset average direction angle of the golf club, the shot analysis means 210 may determine that the golf shot is bad.

The shot analysis means 210 may preset an average record of other users as the determination criterion. Also, it is possible to arbitrarily set a specific determination criterion in a virtual environment.

For example, a ball location range in a virtual environment is preset as a determination criterion of an approach shot, and, when an approach shot taken by a user deviates from the preset ball location range by a preset allowable value or more, the shot analysis means 210 may determine that the approach shot is bad.

Also, when the golf shot taken by the user is out of bounds (OB) or is located in a hazard, the shot analysis means 210 may determine that the golf shot is bad.

Meanwhile, the set environment control means 230 may be configured to refer to information regarding a golf club recognized by the club recognition means 50 in realizing a virtual environment based on the practice curriculum setting information.

That is, in a case in which the practice curriculum setting information includes a set condition regarding kind of a golf club to be used for golf practice or a set condition regarding a practice distance, the set environment control means 230 is preferably configured to determine whether the golf club recognized by the club recognition means 50 coincides with the golf club according to the set condition and, upon determining that the golf club recognized by the club recognition means 50 coincides with the golf club according to the set condition, to provide a virtual environment according to the practice curriculum setting information.

For example, in a case in which practice of a driver shot is set in the practice curriculum setting information, when a user stands on a hitting plate while holding a number 5 iron instead of a number 1 wood driver, the club recognition means 50 recognizes the number 5 iron, and the set environment control means 230 confirms that the golf club used by the user does not coincide with the golf club based on the practice curriculum setting information and informs the user that the user has selected an incorrect golf club.

At this time, the set environment control means 230 may ask the user to terminate the golf practice according to the practice curriculum setting information so as to confirm whether the user intends not to perform the golf practice according to the practice curriculum setting information.

Hereinafter, a virtual golf simulation apparatus according to another embodiment of the present invention and a server with the virtual golf simulation apparatus through a network will be described in detail with reference to FIG. 2.

Figure 2:
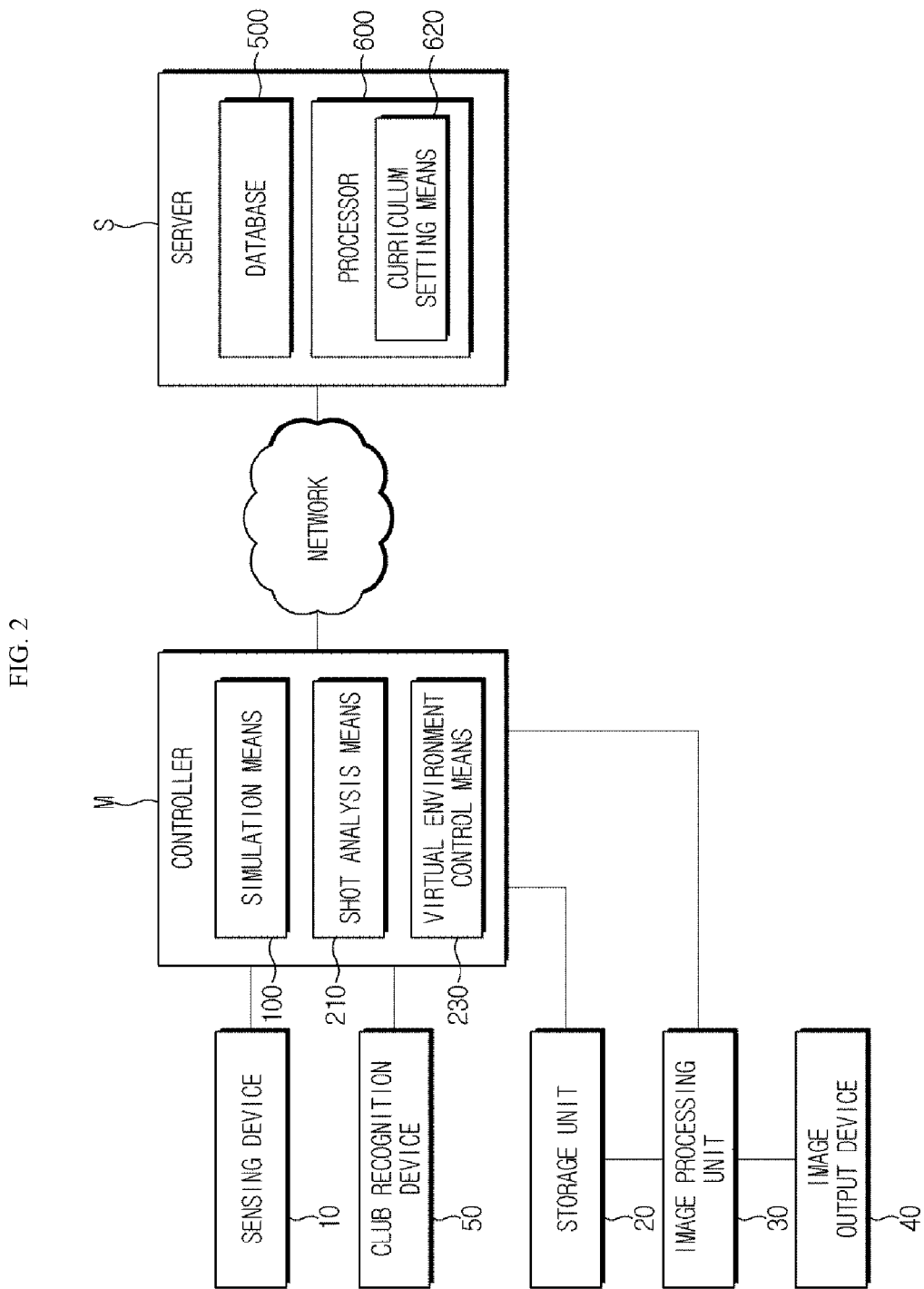

As shown in FIG. 2, the virtual golf simulation apparatus according to this embodiment of the present invention may be configured to be connected with a server S through a network. The network may be provided in various forms, such as wired/wireless Internet and near field communication.

The virtual golf simulation apparatus according to this embodiment includes a sensing device 10, a storage unit 20, an image processing unit 30, an image output device 40, a club recognition device 50, and a controller M. That is, the virtual golf simulation apparatus according to this embodiment is basically identical in construction to the virtual golf simulation apparatus shown in FIG. 1 except that the controller M of the virtual golf simulation apparatus according to this embodiment is somewhat different in construction from the controller M of the virtual golf simulation apparatus shown in FIG. 1.

The controller M of the virtual golf simulation apparatus according to this embodiment includes a simulation means 100, a shot analysis means 210, and a set environment control means 230. The controller M does not include a curriculum setting means as shown in FIG. 1. Instead, a component for executing substantially the same function as the curriculum setting means shown in FIG. 1 is provided in the server S.

The sensing device 10, the storage unit 20, the image processing unit 30, the image output device 40, and the club recognition device 50 and basic functions of the controller M are substantially identical to those of the virtual golf simulation apparatus shown in FIG. 1, and therefore, a detailed description thereof will be omitted.

In the embodiment shown in FIG. 2, the server S includes a database 500 and a processor 600. The processor 600 includes a curriculum setting means 620.

The database 500 is preferably configured to store identification information of a plurality of virtual golf simulation apparatuses connected to the server S and user information, such as personal information of users registered in the server S, skill ranking information of the users, record information of the user.

The processor 600 is a component for performing overall functions, such as management and control, of the virtual golf simulation apparatuses connected to the server S. For example, the processor 600 may receive request of information from the virtual golf simulation apparatuses connected to the server S, extract the requested information from the database 500, and transmit the extracted information to the virtual golf simulation apparatuses connected to the server S.

When a user logs in to a virtual golf simulation apparatus, therefore, the processor 600 extracts information regarding the logged in user from the database 500 and transmits the extracted information to the virtual golf simulation apparatus. Consequently, golf simulation is performed in a state in which the user is recognized by the virtual golf simulation apparatus.

As shown in FIG. 2, the processor 600 is preferably configured to include a curriculum setting means 620 for receiving record information regarding the golf practice result of the user from the virtual golf simulation apparatus, analyzing the received record of the user, and automatically setting items regarding a practice mode and a practice condition in which the user will practice a golf shot based on the analysis result to generate practice curriculum setting information.

The curriculum setting means 620 may be configured to analyze the record according to a preset program, to automatically determine items which the user needs to practice based on the analysis result, and to automatically generate practice curriculum setting information according to the determined items.

In this embodiment, therefore, the virtual golf simulation apparatus transmits the record regarding the golf practice result of the user to the server S, and the curriculum setting means 620 of the server S analyzes the received record and sets items regarding a practice mode and a practice condition in which the user will practice a golf shot based on the analysis result to generate practice curriculum setting information. The generated practice curriculum setting information is transmitted to the virtual golf simulation apparatus.

Upon receiving the practice curriculum setting information for the user from the server S, the controller M of the virtual golf simulation apparatus stores the received practice curriculum setting information in the storage unit 20, and the set environment control means 230 controls the image processing unit to realize a virtual environment based on the received practice curriculum setting information so that the user can perform golf practice in a user-customized practice environment.

Preferably, when the user performs golf practice in the user-customized practice environment, the shot analysis means 210 evaluates a golf shot taken by the user according to a preset determination criterion, and the set environment control means 230 allows the user to request correction of the practice curriculum setting information based on the evaluation result.

For example, in a case in which, when a user performs golf practice in a virtual practice environment according to a practice curriculum of the user, a certain number of bad golf shots are taken by the user, the user may generate an interface for requesting correction of the practice curriculum setting information of the user so that the user can request correction of the practice curriculum setting information of the user.

In a case in which the user requests such correction, the practice curriculum setting information may be corrected based on the analysis result of the shot analysis means 210, or the practice curriculum setting information may be transmitted to the server S or another terminal so that the practice curriculum setting information can be corrected.

Hereinafter, a virtual golf simulation apparatus according to another embodiment of the present invention and a server with the virtual golf simulation apparatus through a network will be described in detail with reference to FIG. 3.

Figure 3:
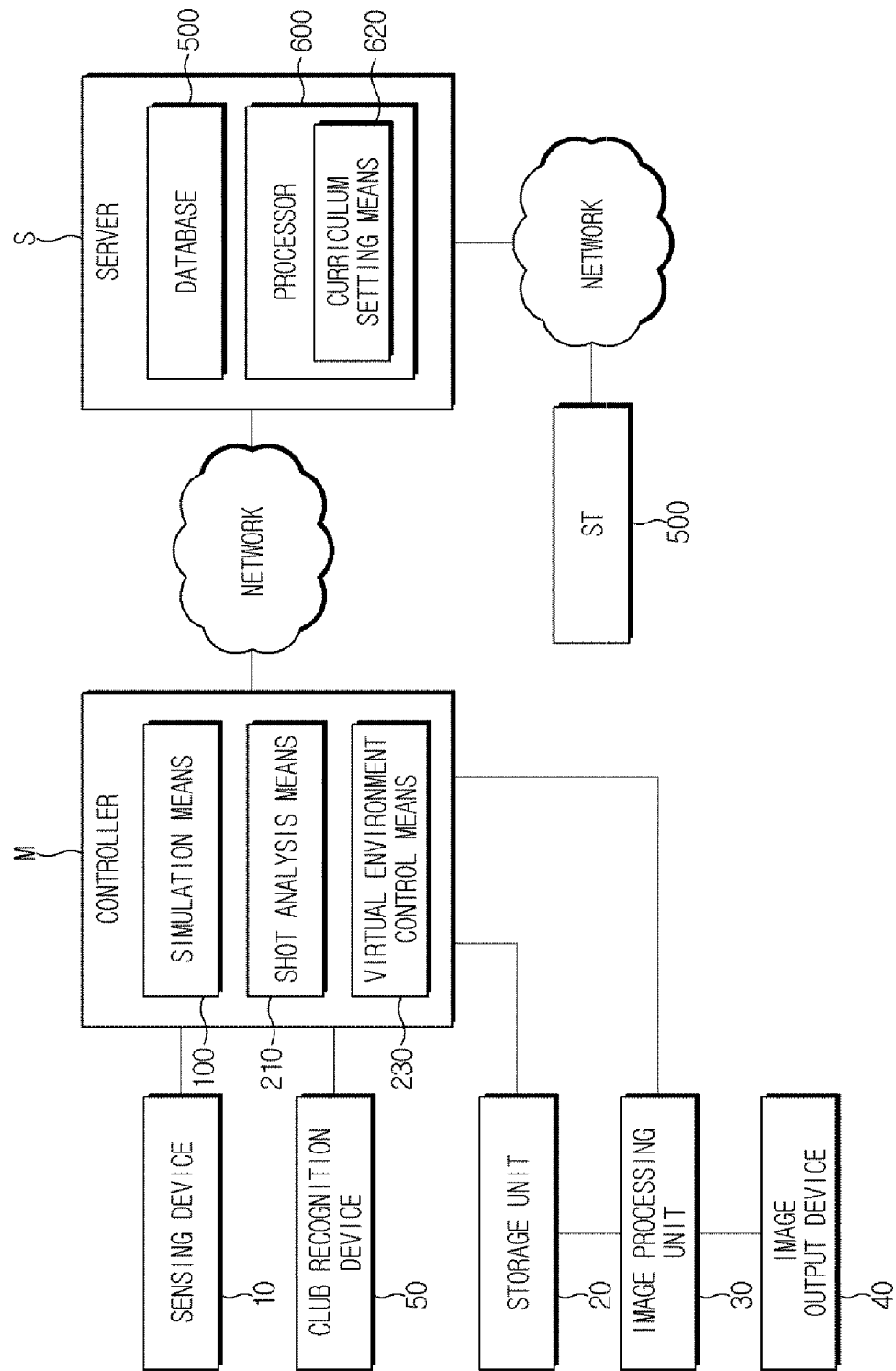

As shown in FIG. 3, the virtual golf simulation apparatus and the server according to this embodiment of the present invention are substantially identical in construction to the virtual golf simulation apparatus and the server shown in FIG. 2 except that a specialist terminal ST is connected to the server S shown in FIG. 3 through a network.

In the embodiment shown in FIG. 2, the curriculum setting means 620 of the server S automatically determines items which a user needs to practice according to a preset program to automatically generate practice curriculum setting information. In the embodiment shown in FIG. 3, on the other hand, a specialist (for example, a pro golfer or a lesson pro) executes the curriculum setting means 620 of the server S through the specialist terminal ST to manually input setting information regarding a practice curriculum in a state in which the specialist terminal ST is connected to the server S so that practice curriculum setting information is generated according to the input setting information.

The practice curriculum setting information according to the setting information input through the specialist terminal ST may be directly stored in the database 500 of the server S. Alternatively, the practice curriculum setting information may be stored in the specialist terminal ST, and the stored practice curriculum setting information is transmitted to the server S so that the practice curriculum setting information can be stored in the database 500.

The server S the practice curriculum setting information stored as described above to the virtual golf simulation apparatus, and the set environment control means 230 controls a virtual environment to be realized according to the received practice curriculum setting information, thereby providing a user-customized practice environment.

Hereinafter, an example of a virtual environment realized by the virtual golf simulation apparatus according to the present invention will be described in detail with reference to FIGS. 4 to 7.

Figure 4:
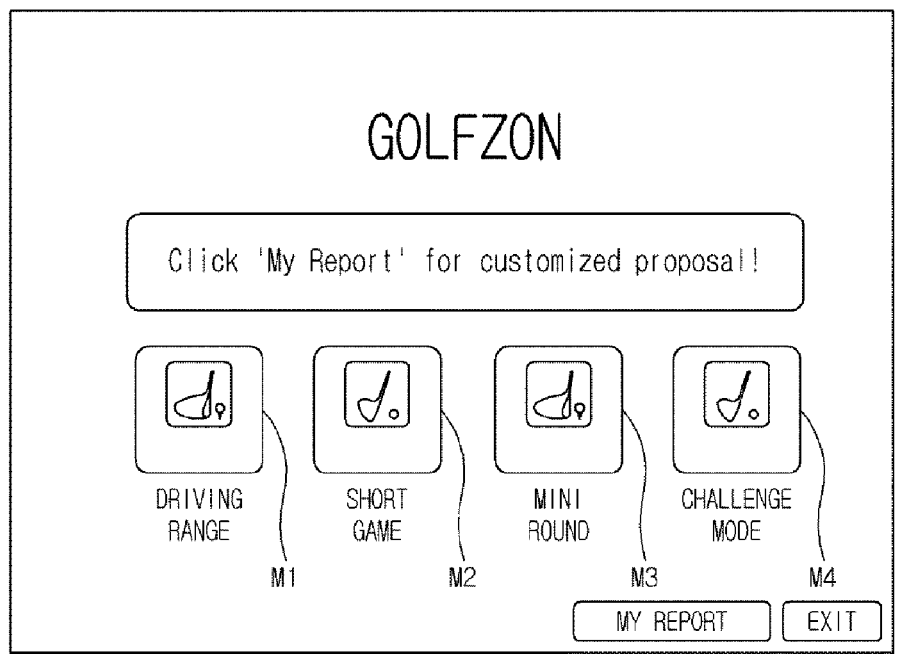
FIGS. 4 to 7 are views illustrating an example of a virtual environment realized by the virtual golf simulation apparatus according to the present invention.

First, as shown in FIG. 4, when the virtual golf simulation apparatus is operated, preset practice modes are displayed so that a user can select one of the practice modes.

In an example shown in FIG. 4, a long game practice mode M1, a short game practice mode M2, a real game practice mode M3, and a mission execution mode M4 are displayed.

The long game practice mode M1 is a practice mode set to intensively practice at least one golf shot selected from among a driver shot, a wood shot, and an iron shot and to realize a virtual environment based thereon.

The short game practice mode M2 is a practice mode set to intensively practice at least one golf shot selected from among a pitch shot, a chip shot, and putting and to realize a virtual environment based thereon.

The real game practice mode M3 is a practice mode set to practice a golf shot practiced in a different practice mode on a simple golf course having about three or four holes as in a real game and to realize a virtual environment based thereon.

The mission execution mode M4 is a practice mode set to achieve a goal step by step with respect to some kinds of golf shots and to realize a virtual environment based thereon.

Figure 5:
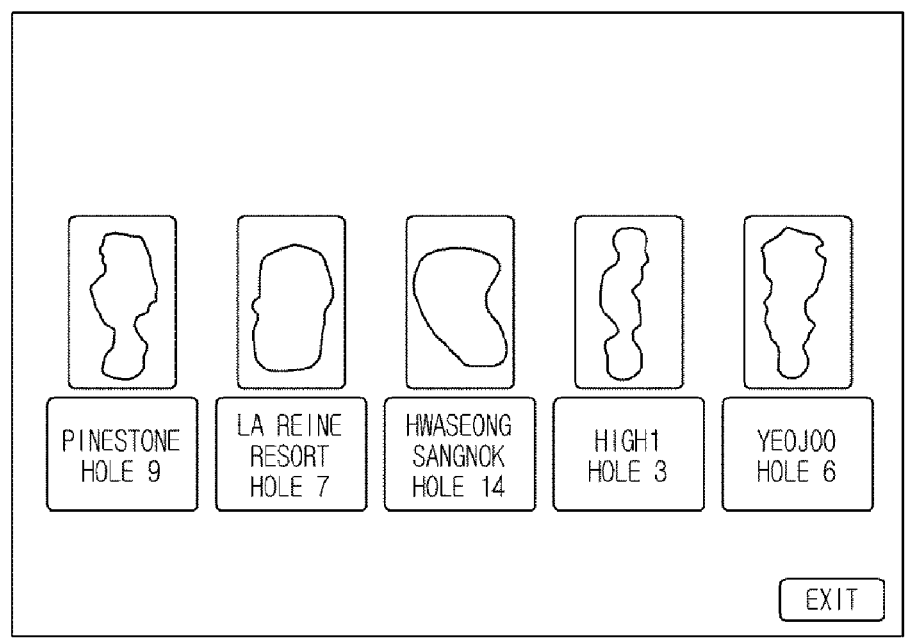

After one of the practice modes is selected, a virtual place at which a golf shot based on the selected practice mode will be taken, i.e. a virtual golf course, may be selected. FIG. 5 shows an example of a screen displaying various virtual golf courses, one of which can be selected.

In an example shown in FIG. 5, a golf course and a specific hole of the golf course can be simultaneously selected. However, the present invention is not limited thereto. For example, a golf course may be selected first, and then a user may directly select a desired one from among 18 holes of the selected golf course.

Figure 6:
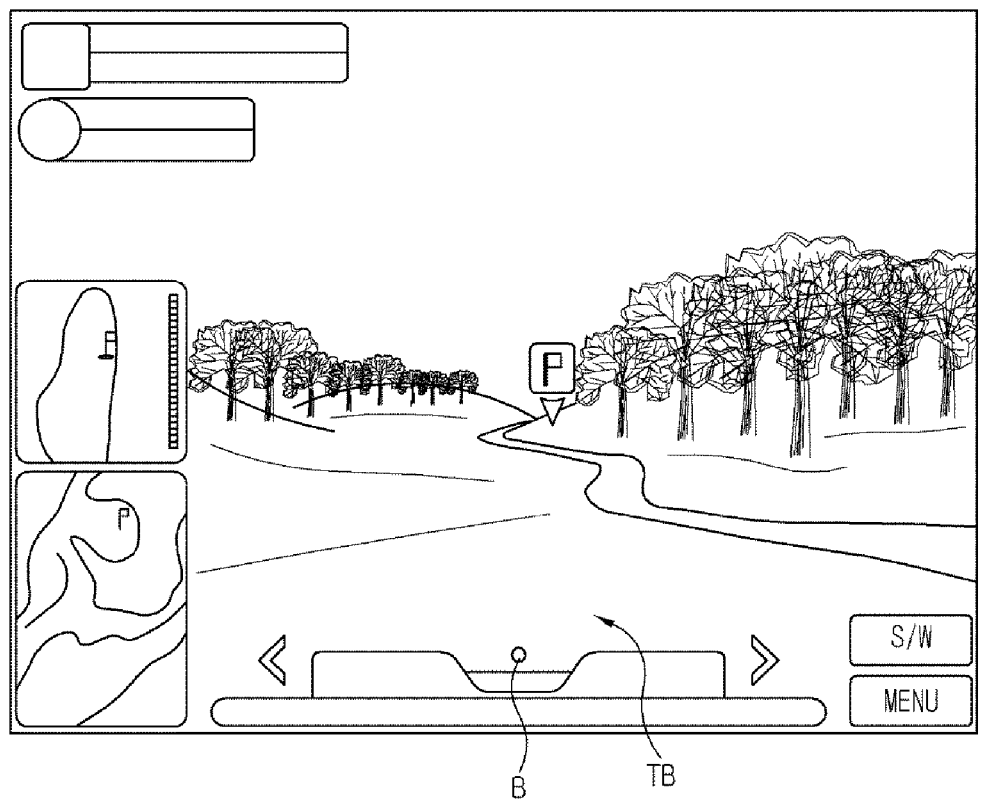

On the other hand, FIG. 6 shows an example of a virtual environment realized based on the practice mode and the virtual golf course selected by the user. Specifically, FIG. 6 shows that a user selects drive shot practice in the long game practice mode M1 and hole number 14 of High 1 Country Club (CC), which is a virtual golf course, and a virtual environment is realized based on the position of a tee box (TB) at which a user can take a driver shot with respect to a ball B on hole number 14 of High 1 CC.

Consequently, it is possible for the user to intensively and repeatedly practice a driver shot at the position of the tee box on hole number 14 of High 1 CC.

If the user selects iron shot practice, a virtual environment is realized based on the position of the selected virtual golf course at which an iron shot can be taken. Since the iron shot can be taken at any position remote from a green by a certain distance, it is possible for the user to select the position at which an iron shot is to be taken (at this time, several positions may be illustratively displayed so that the user can select one of the positions) or to directly designate the position at which an iron shot is to be taken and practice the iron shot. Alternatively, a virtual environment may be realized so that the user does not directly select or designate a specific position but takes an iron shot at a preset position.

Figure 7:
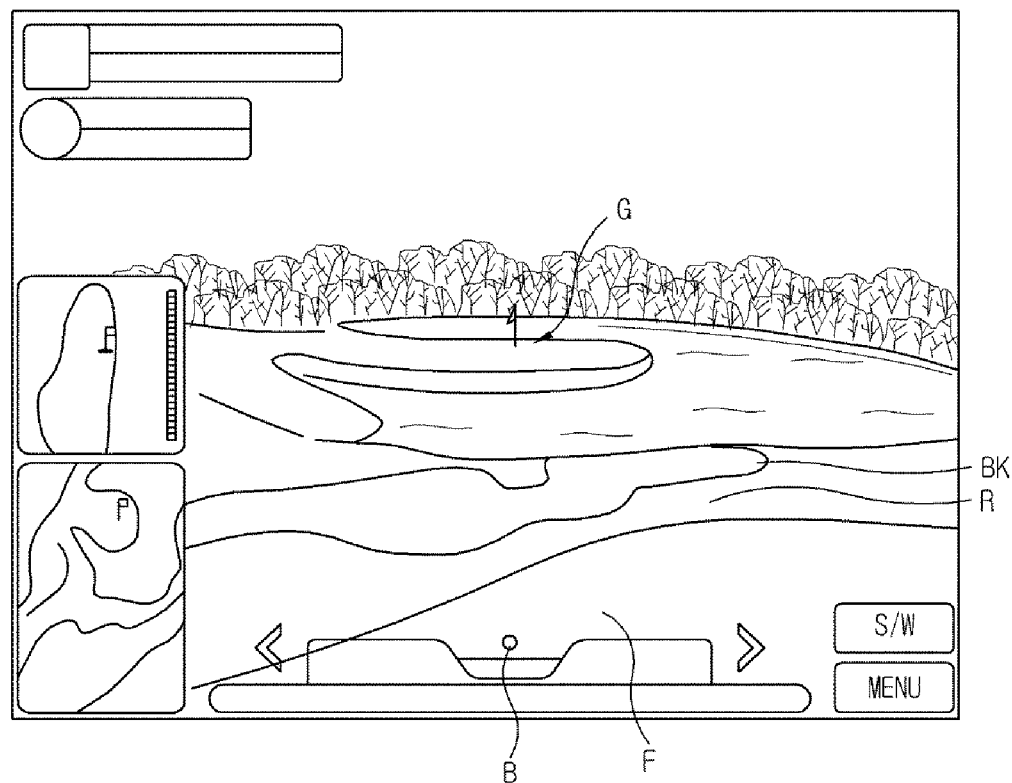

Meanwhile, FIG. 7 shows that a user selects pitch shot practice in the short game practice mode and hole number 14 of High 1 CC, which is a virtual golf course, and a virtual environment is realized based on the position at which a user takes a pitch shot on hole number 14 of High 1 CC.

That is, a virtual environment regarding a region in the vicinity of a green of hole number 14 of High 1 CC selected by the user is realized, and the user may select a specific position, such as a fairway F, a rough R, and a bunker BK, in the vicinity of the green G and may hit a ball B at the selected position to repeatedly and intensively practice the pitch shot.

At this time, the user may select hole number 14 of High 1 CC and may take a pitch shot at a preset position at which the pitch shot is to be taken. Alternatively, a virtual environment may be realized so that the user can directly select or designate the position at which the pitch shot is to be taken and can practice the pitch shot at the selected or designated position.

Although not shown, on the other hand, distance sections in the vicinity of the green may be preset before an approach shot is taken, and the user may select or designate one of the distance sections so that the user can practice the approach shot in the selected or designated distance section. Alternatively, it is possible for the user to directly select or designate the position of a pin on the green before putting so that the user can practice putting at the selected or designated position of the pin.

Hereinafter, a user-customized practice environment realized through the virtual golf simulation apparatus according to the present invention will be described in detail with reference to FIGS. 8 to 11.

A record based on the golf practice result in a practice mode or in a plurality of practice modes as shown in FIGS. 4 to 7 is displayed as shown in FIG. 8 so that a user can evaluate his/her golf shot.

FIG. 8 shows a record of 10 recent golf practices of the user. A record in a long game practice mode LS and a record in a short game practice mode SS are displayed in detail. Of course, records in other practice modes may be displayed.

As the record in the long game practice mode LS, a record of golf shots taken by the user using golf clubs for long game practice, i.e. various wood clubs and a long iron club, may be displayed in detail. As the record in the short game practice mode SS, a record of golf shots taken by the user using golf clubs for short game practice, i.e. a sand wedge or a pitch wedge, may be displayed in detail.

As shown in FIG. 8, the record in the long game practice mode is preferably displayed for each golf club, and the record in the short game practice mode is preferably displayed for each distance.

In the respective records LS and SS, items, such as straight probability, a target location rate, a flight distance, a carry, ball speed, club head speed, a smash factor (ball speed/club head speed), backspin, and sidespin, may be analyzed and displayed. In addition to items shown in FIG. 9, various other analysis items may be displayed.

When the user finishes golf practice, a record based on the golf practice result is stored in the storage unit 20 (see FIG. 1) of the virtual golf simulation apparatus or in the database of the server S (see FIGS. 2 and 3), and the record of the user is extracted and analyzed by the curriculum setting means 220 (see FIGS. 1 to 3).

Items regarding the golf club or the distance at which the user record is the worst as the result of analysis of the record may be extracted and set as a practice curriculum. Alternatively, items having a good record but insufficient in total practice time or total number of practice balls may be extracted and set as a practice curriculum.

The record analysis means displays the items determined to need golf practice on the screen displaying the record based on the result of the golf practice performed by the user as shown in FIG. 8 so that the user can intensively perform golf practice with respect to user weaknesses.

Figure 9:
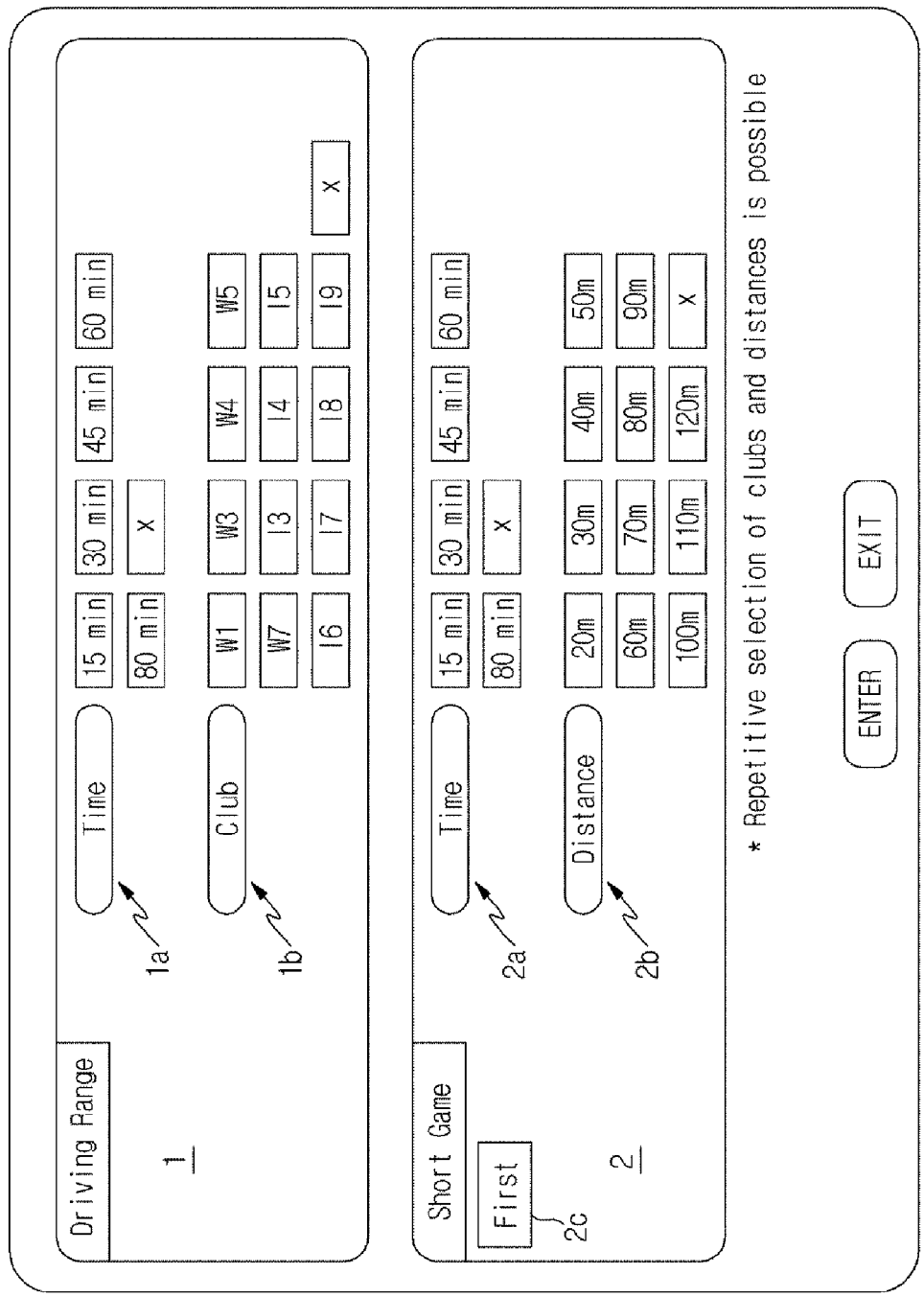
FIG. 9 is a view showing an example of a user practice curriculum set by a curriculum setting means.

Meanwhile, FIG. 9 is a view showing a practice curriculum setting interface for setting a practice curriculum for the user through which a curriculum setting means according to the analysis result of the user record as described above.

As shown in FIG. 9, the practice curriculum setting interface displayed by the curriculum setting means may set items regarding a practice mode to be practiced by the user, i.e. items regarding practice order, practice time for each practice mode, kind of golf clubs, and a practice distance so that a specialist, such as a lesson pro, can manually set a practice curriculum based on the record analysis result of the golf practice performed by the user.

The practice curriculum setting interface shown in FIG. 9 may be divided into a part regarding practice condition setting in a long game practice mode, i.e. a long game practice mode condition setting part 1, and a part regarding practice condition setting in a short game practice mode, i.e. a short game practice mode condition setting part 2.

The long game practice mode condition setting part 1 may include a practice time condition setting part 1a and a practice club condition setting part 1b. The short game practice mode condition setting part 2 may include a practice time condition setting part 2a, a practice distance condition setting part 2b, and a practice order condition setting part 2c.

When specific items in the practice time condition setting part 1a and the practice club condition setting part 1b of the long game practice mode condition setting part 1 are selected, condition setting based on the selected items is performed. When a mark "X" in each item is selected, the long game practice mode is excluded from the practice curriculum.

When specific items in the practice time condition setting part 2a and the practice distance condition setting part 2b of the short game practice mode condition setting part 2 are selected, condition setting based on the selected items is performed. When the practice order condition setting part 2c is selected, setting may be performed so that the order of the long game practice mode and the short game practice mode is changed.

For example, in a case in which, as the result of analysis of a record of golf practice performed by a specific user, a record of a driver shot and an approach shot in a distance of 50 m or less is relatively low, and therefore, intensive practice for the driver shot and the approach shot is necessary, a specialist may select 30 minutes in the practice time condition setting part 1a of the long game practice mode condition setting part 1 and W1 in the practice club condition setting part 1b of the long game practice mode condition setting part 1, and may select 60 minutes in the practice time condition setting part 2a of the short game practice mode condition setting part 2 and 20 m, 30 m, 40 m, and 50 m in the practice distance condition setting part 2b of the short game practice mode condition setting part 2 on a practice curriculum setting screen. In this way, a practice curriculum of the user may be set.

When the setting of the practice curriculum of the user is completed, practice curriculum setting information is generated according to set items, and the set environment control means of the virtual golf simulation apparatus realizes a practice environment according to the generated practice curriculum setting information so that the user can intensively perform golf practice in a user-customized practice environment.

FIG. 9 shows an interface screen when the specialist manually sets the practice curriculum. Although the specialist manually sets the practice curriculum, the practice curriculum may be automatically set by the controller of the virtual golf simulation apparatus according to a preset program or may be automatically set by the processor of the server according to a preset program.

In a case in which the practice curriculum is automatically set by the controller or by the processor, the analysis result of the user record is determined by the preset program. For example, the controller or the processor may preset items regarding a case in which straight probability of a wood club is less than 50%, a case in which straight probability of an iron club is less than 70%, and a case in which flight distances of irons including a number 3 iron to a number 6 iron are not increased by 7 m or more for each club on the basis of an average flight distance of a number 7 iron as the analysis result of the user record, and, if any one of the cases is applied, may reflect the applied case in a practice curriculum.

FIG. 9 shows setting of items regarding a practice mode, practice time, a club, and a distance. In addition, the curriculum setting means may set an item regarding a golf practice goal record of a user and a virtual environment in which the user performs golf practice.

For example, in a case in which a practice curriculum of a driver shot and an approach shot with a distance of 20 m and 30 m is set, a goal record, such as a straight probability of 70% and a flight distance of 200 m, may be set for the driver shot, and a goal record, such as a target location rate of 80%, may be set for the approach shot with a distance of 20 m and 30 m.

Also, a virtual environment in which driver shot practice can be performed at a position at which a driver shot can be taken on a specific hole of a specific golf course may be set, or a virtual environment in which approach shot practice can be performed at a specific position corresponding to 20 m and 30 m from a green on a specific hole of a specific golf course may be set. In addition, all items regarding a virtual environment for golf practice may be set.

Meanwhile, when the practice curriculum setting information is generated as described above, the practice curriculum setting information may be displayed on a main screen to inform a user using virtual golf simulation that preparation for a customized practice environment has been completed.

For example, a sentence "a customized proposal for 000 has been set" may be displayed on the screen to inform the user that practice curriculum setting information has been generated.

When the preparation of providing the customized practice environment according to the practice curriculum setting information for the user is completed, golf practice based on the practice curriculum setting information for the user is started according to user request for start or automatically.

Figure 10:
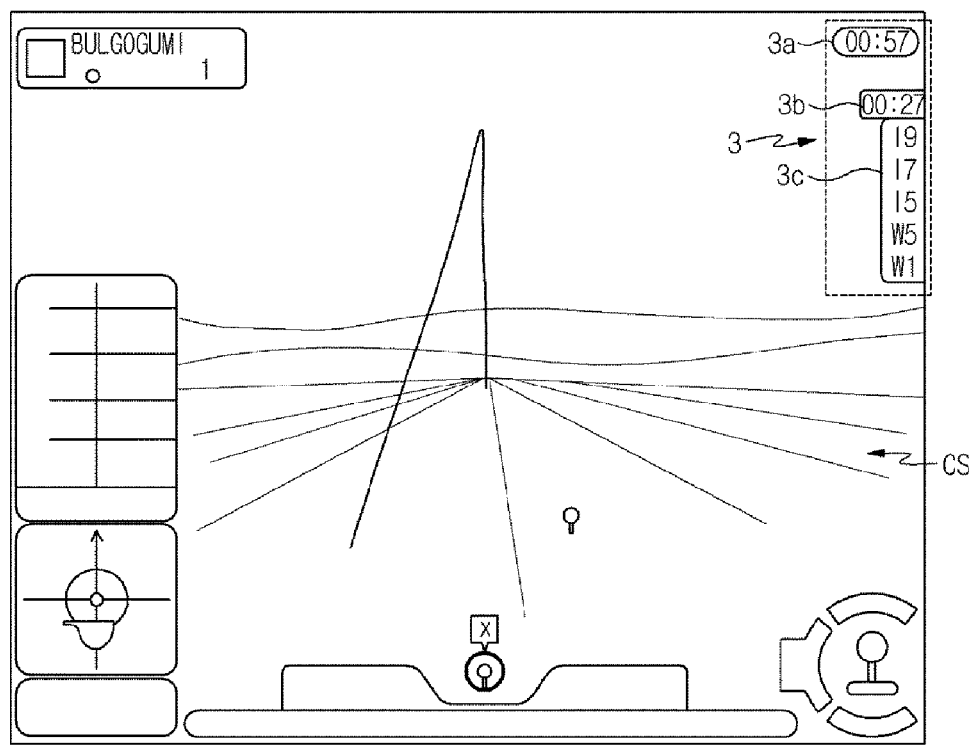
FIG. 10 is a view showing an example of a set environment realized according to practice curriculum setting information regarding a user.

FIG. 10 is a view showing an example of a customized practice environment realized according to the practice curriculum setting information.

A curriculum display part 3 indicating information regarding practice time and information regarding a golf club to be used for practice is displayed at one side of a screen CS on which a customized practice environment is realized.

Specifically, the curriculum display part 3 displays total practice time 3a according to practice curriculum setting information, practice time 3b in the present practice mode, and a golf club 3c to be used for practice. The golf club to be used for practice may be displayed using a color different from that of the golf club already used for practice.

Meanwhile, when golf practice according to the practice curriculum setting information as described above, i.e. customized practice, is finished, a record based on the customized practice result is displayed as shown in FIG. 11.

In an example shown in FIG. 11, a practice outline 4 indicating practice time for each practice mode and the number of practice balls based on the customized practice result and a record regarding the detailed golf practice result for each practice mode, such as a record 5 based on the customized practice result in the long game practice mode and a record 6 based on the customized practice result in the short game practice mode, are displayed.

The records 5 and 6 in the respective practice modes may indicate records regarding various evaluation items for each golf club or records regarding various evaluation items for each practice distance. Also, the record based on the user-customized practice may be compared with an average record of the user or an average record of several users having the same skill ranking as the user.

In a case in which as the analysis result of the shot analysis means, the record of the user satisfies a preset condition, e.g. the user has taken a preset number of bad golf shots, the user may request correction of the practice curriculum setting information. In a case in which the user requests correction of the practice curriculum setting information, the practice curriculum setting information may be corrected based on the analysis result of the shot analysis means, or the practice curriculum setting information may be transmitted to the server or another terminal so that the practice curriculum setting information can be corrected.

Hereinafter, various embodiments of a user-customized practice environment provision method using virtual golf simulation according to the present invention will be described in detail with reference to FIGS. 12 to 16.

First, a user-customized practice environment provision method using virtual golf simulation according to an embodiment of the present invention will be described in detail with reference to FIG. 12.

Figure 12:
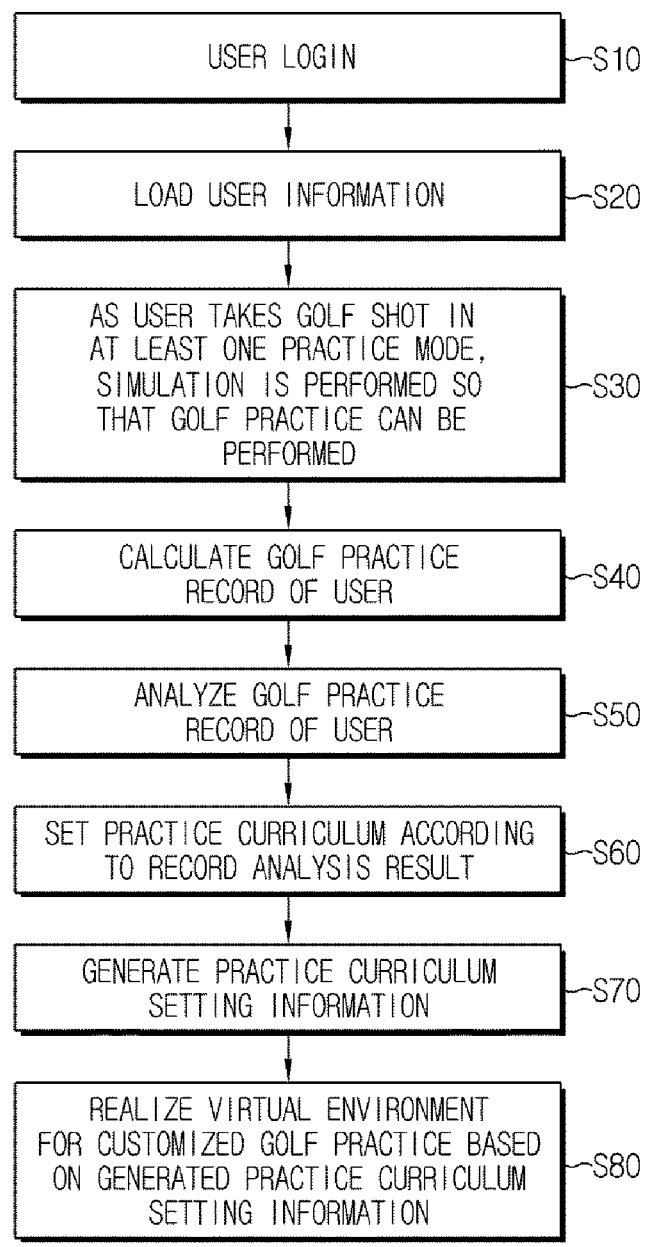
FIGS. 12 to 16 are flow charts illustrating various embodiments of a user-customized practice environment provision method using virtual golf simulation according to the present invention.

As shown in FIG. 12, a user logs in through a virtual golf simulation apparatus (S10).

After user login, the virtual golf simulation apparatus extracts information regarding the user stored in a storage unit and loads the extracted user information to recognize the presently logged in user (S20).

As the user selects at least one practice mode and takes a golf shot in a virtual environment based on the selected practice mode, virtual golf simulation is performed so that golf practice can be performed (S30).

A shot analysis means analyzes the simulation result of the golf shot and calculates a record for each preset item (S40).

A curriculum setting means analyzes the calculated record (S50), sets a practice curriculum regarding a practice mode and practice condition necessary for the user according to the analysis result (S60), and generates practice curriculum setting information based on the set practice curriculum (S70).

A set environment control means realizes a virtual environment for customized golf practice based on the generated practice curriculum setting information so that the user can perform golf practice according to the set practice curriculum (S80).

Figure 13:
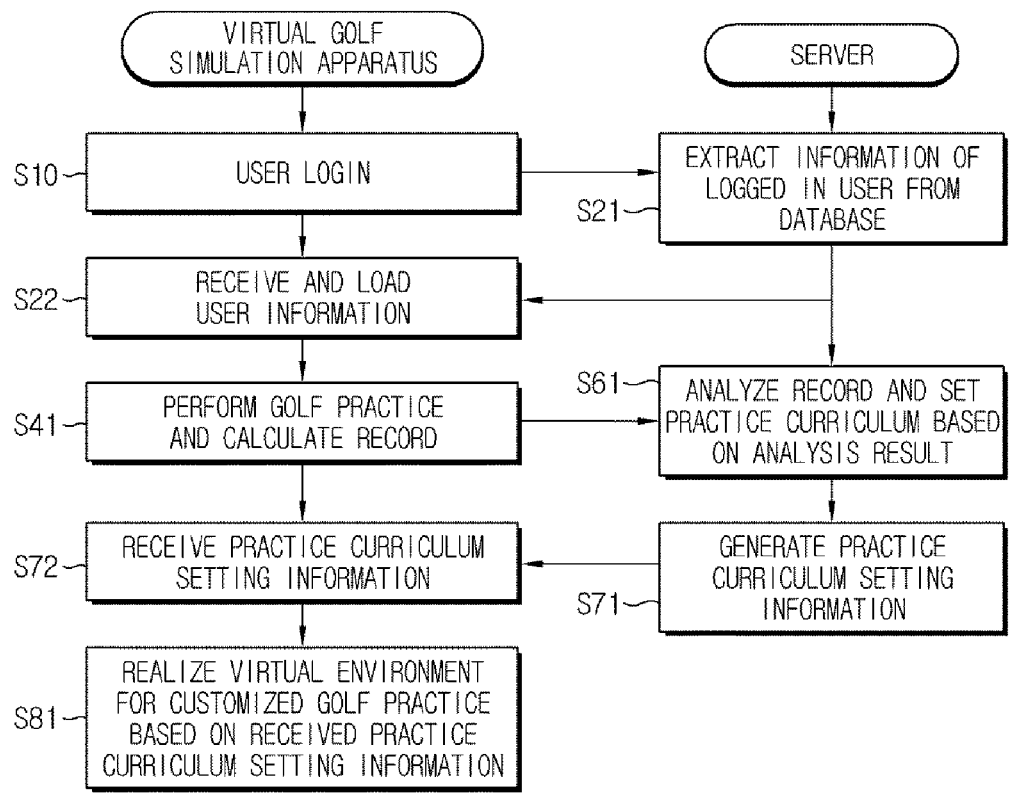

Hereinafter, a user-customized practice environment provision method using virtual golf simulation according to another embodiment of the present invention will be described in detail with reference to FIG. 13.

In the embodiment shown in FIG. 12, record analysis and practice curriculum setting are performed by the virtual golf simulation apparatus. In the embodiment shown in FIG. 13, on the other hand, record analysis and generation of practice curriculum setting information are performed by a server.

As a user logs in through a virtual golf simulation apparatus (S10), a server connected with the virtual golf simulation apparatus through a network extracts information regarding the logged in user from a database (S21), and transmits the extracted user information to the virtual golf simulation apparatus. The virtual golf simulation apparatus loads the received user information (S22).

In a state in which the user information is loaded by the virtual golf simulation apparatus, the user selects at least one practice mode, and takes a golf shot in a virtual environment based on the selected practice mode. As a result, virtual golf simulation is performed so that golf practice can be performed, and a record based on the golf practice is calculated (S41).

The record of the golf practice performed by the user is transmitted to the server. The server analyzes the received user record, sets a practice curriculum regarding practice items necessary for the user according to the analysis result (S61), and generates practice curriculum setting information based on the set practice curriculum (S71).

The server transmits the generated practice curriculum setting information to the virtual golf simulation apparatus. The virtual golf simulation apparatus receives the practice curriculum setting information (S72), and realizes a virtual environment for customized golf practice based on the received practice curriculum setting information (S81).

Figure 14:
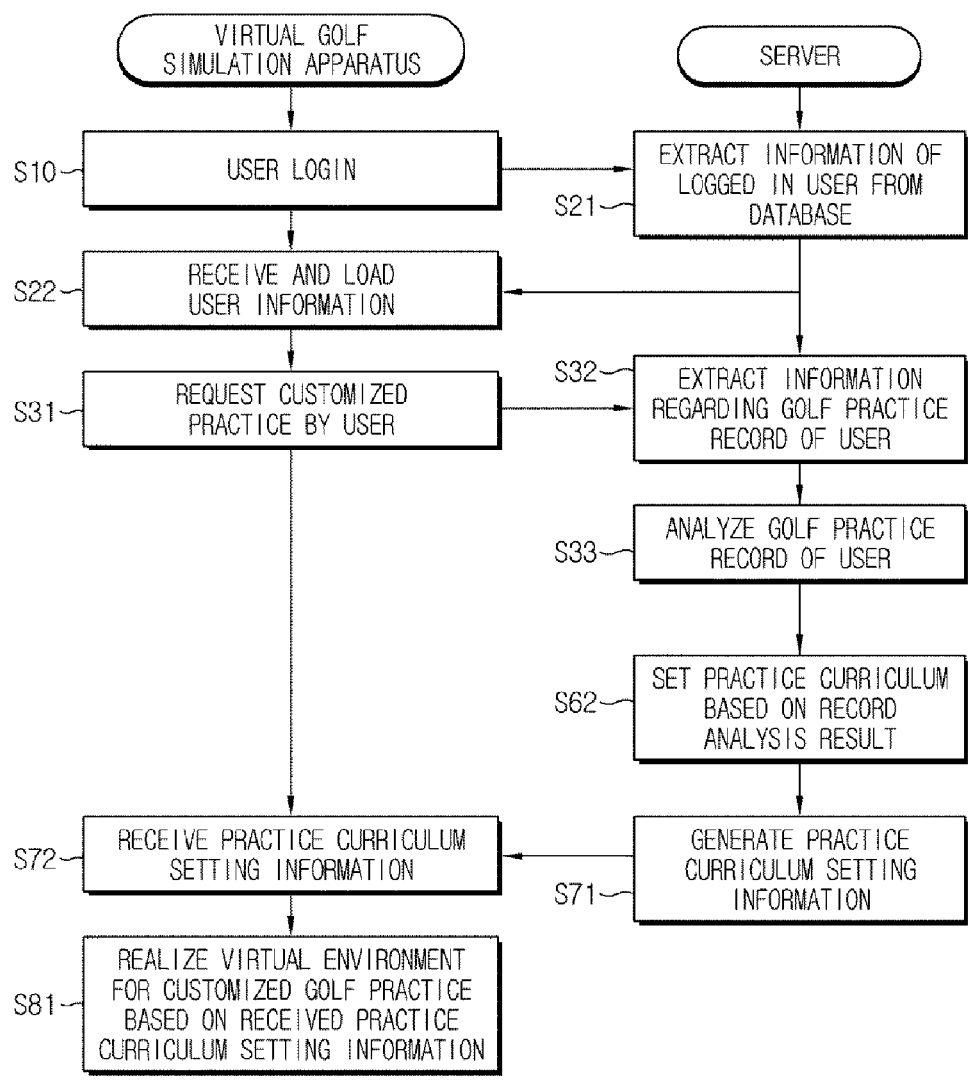

Hereinafter, a user-customized practice environment provision method using virtual golf simulation according to another embodiment of the present invention will be described in detail with reference to FIG. 14.

As a user logs in through a virtual golf simulation apparatus (S10), a server connected with the virtual golf simulation apparatus through a network extracts information regarding the logged in user from a database (S21), and transmits the extracted user information to the virtual golf simulation apparatus. The virtual golf simulation apparatus loads the received user information (S22).

In a state in which the user information is loaded by the virtual golf simulation apparatus, the user requests customized practice (S31). That is, instead of analyzing a record based on the present golf practice result of the user to set a practice curriculum, the user requests a customized practice program to strengthen user weaknesses based on the previous record of the user (for example, the record of 10 recent golf practices of the user).

As the user requests customized practice, the server extracts information regarding the golf practice record of the user stored in the database (S32), and analyzes the extracted record (S33).

Subsequently, the server sets a practice curriculum regarding practice items necessary for the user according to the analysis result of the record (S62), and generates practice curriculum setting information based on the set practice curriculum (S71).

The server transmits the generated practice curriculum setting information to the virtual golf simulation apparatus. The virtual golf simulation apparatus receives the practice curriculum setting information (S72), and realizes a virtual environment for customized golf practice based on the received practice curriculum setting information (S81).

Figure 15:
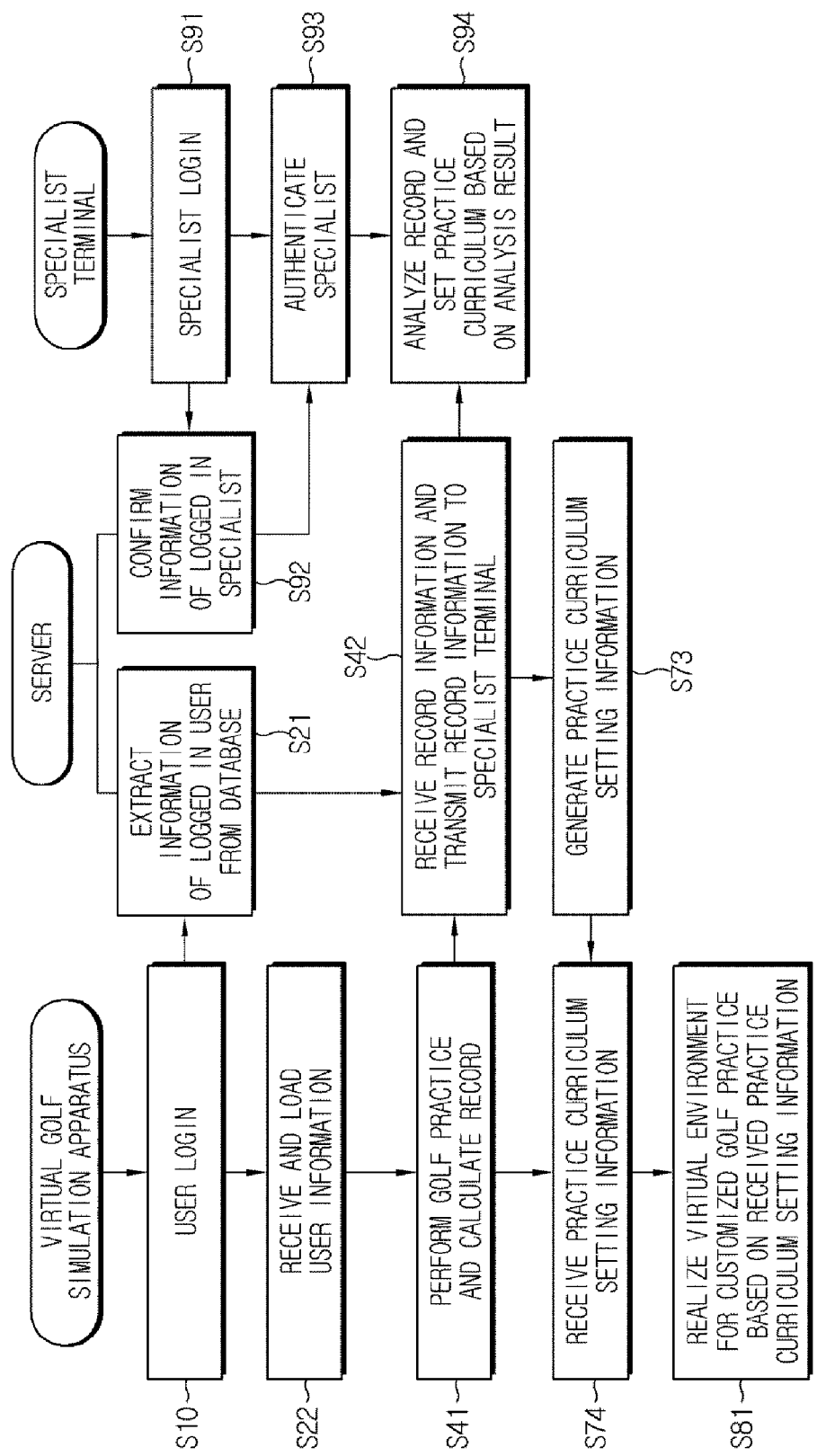

Hereinafter, a user-customized practice environment provision method using virtual golf simulation according to another embodiment of the present invention will be described in detail with reference to FIG. 15.

As a user logs in through a virtual golf simulation apparatus (S10), a server connected with the virtual golf simulation apparatus through a network extracts information regarding the logged in user from a database (S21), and transmits the extracted user information to the virtual golf simulation apparatus. The virtual golf simulation apparatus loads the received user information (S22).

Meanwhile, the server is also connected with a terminal of a golf specialist, such as a lesson pro, through a network. As the specialist logs in through the terminal (S91), the server confirms information regarding the logged in specialist (S92) to perform specialist authentication (S93).

In a state in which the user information is loaded by the virtual golf simulation apparatus, the user selects at least one practice mode, and takes a golf shot in a virtual environment based on the selected practice mode. As a result, virtual golf simulation is performed so that golf practice can be performed, and a record based on the golf practice is calculated (S41).

The record of the golf practice performed by the user is transmitted to the server. The server transmits the received record information to the specialist terminal (S42).

The record information of the user transmitted to the specialist terminal is analyzed by the specialist, and the specialist sets a practice curriculum regarding practice items necessary for the user through the terminal based on the analysis result (S94).

Subsequently, practice curriculum setting information is generated based on the practice curriculum set by the specialist (S73). The generated practice curriculum setting information is transmitted from the server to the virtual golf simulation apparatus. The virtual golf simulation apparatus receives the practice curriculum setting information (S74), and realizes a virtual environment for customized golf practice based on the received practice curriculum setting information (S81).

Figure 16:
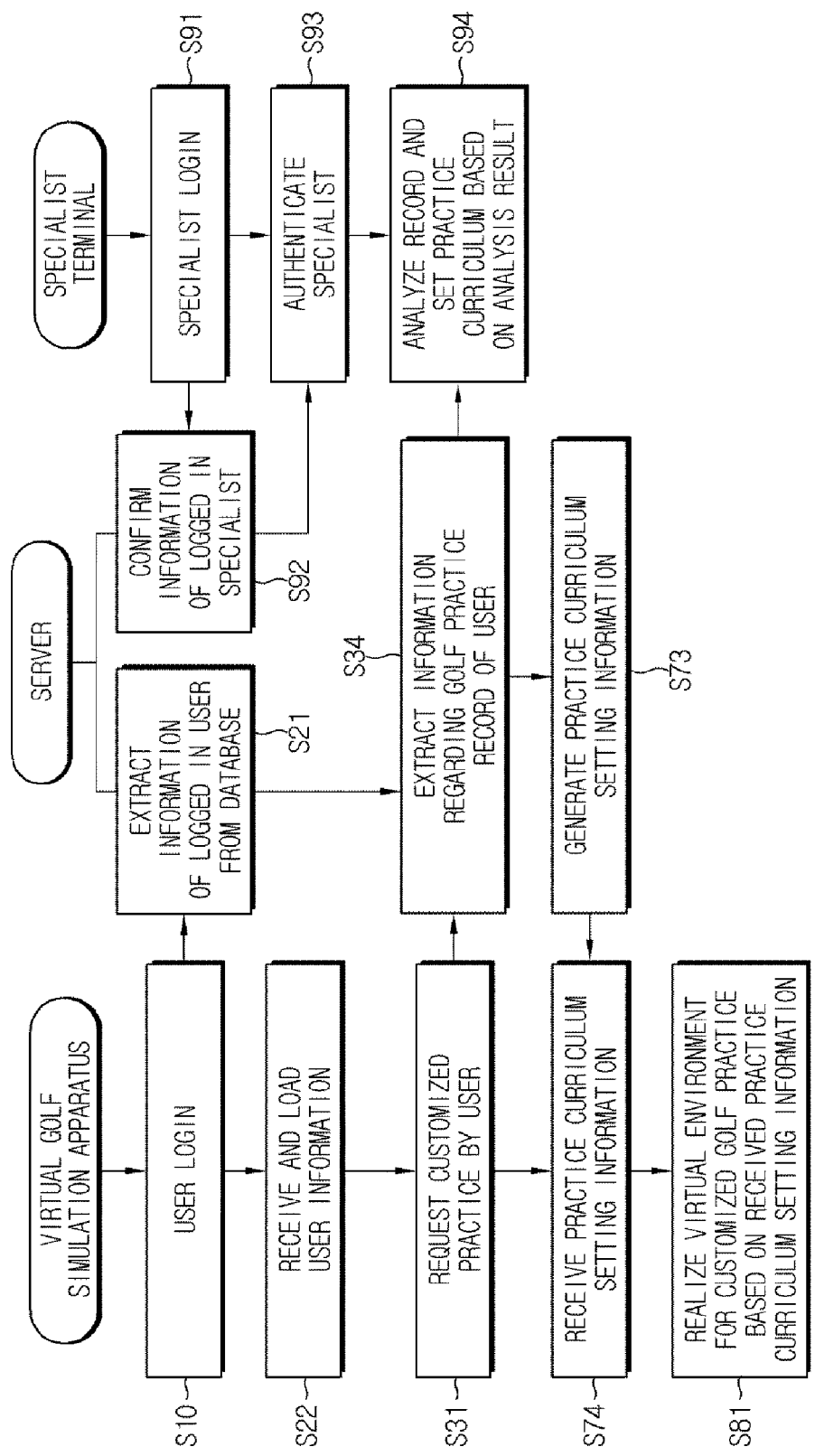

Hereinafter, a user-customized practice environment provision method using virtual golf simulation according to a further embodiment of the present invention will be described in detail with reference to FIG. 16.

As a user logs in through a virtual golf simulation apparatus (S10), a server connected with the virtual golf simulation apparatus through a network extracts information regarding the logged in user from a database (S21), and transmits the extracted user information to the virtual golf simulation apparatus. The virtual golf simulation apparatus loads the received user information (S22).

Meanwhile, the server is also connected with a terminal of a golf specialist, such as a lesson pro, through a network. As the specialist logs in through the terminal (S91), the server confirms information regarding the logged in specialist (S92) to perform specialist authentication (S93).

In a state in which the user information is loaded by the virtual golf simulation apparatus, the user requests customized practice (S31). That is, instead of that a record is analyzed based on the present golf practice result of the user to set a practice curriculum, the user requests a customized practice program to strengthen user weaknesses based on the previous record of the user.

As the user requests customized practice, the server extracts information regarding the golf practice record of the user stored in the database (S34), and transmits the extracted record to the specialist terminal.

The record information of the user transmitted to the specialist terminal is analyzed by the specialist, and the specialist sets a practice curriculum regarding practice items necessary for the user through the terminal based on the analysis result (S94).

Subsequently, practice curriculum setting information is generated based on the practice curriculum set by the specialist (S73). The generated practice curriculum setting information is transmitted from the server to the virtual golf simulation apparatus. The virtual golf simulation apparatus receives the practice curriculum setting information (S74), and realizes a virtual environment for customized golf practice based on the received practice curriculum setting information (S81).

Hereinafter, a virtual golf simulation apparatus according to another embodiment of the present invention will be described in detail with reference to FIG. 17.

Figure 17:
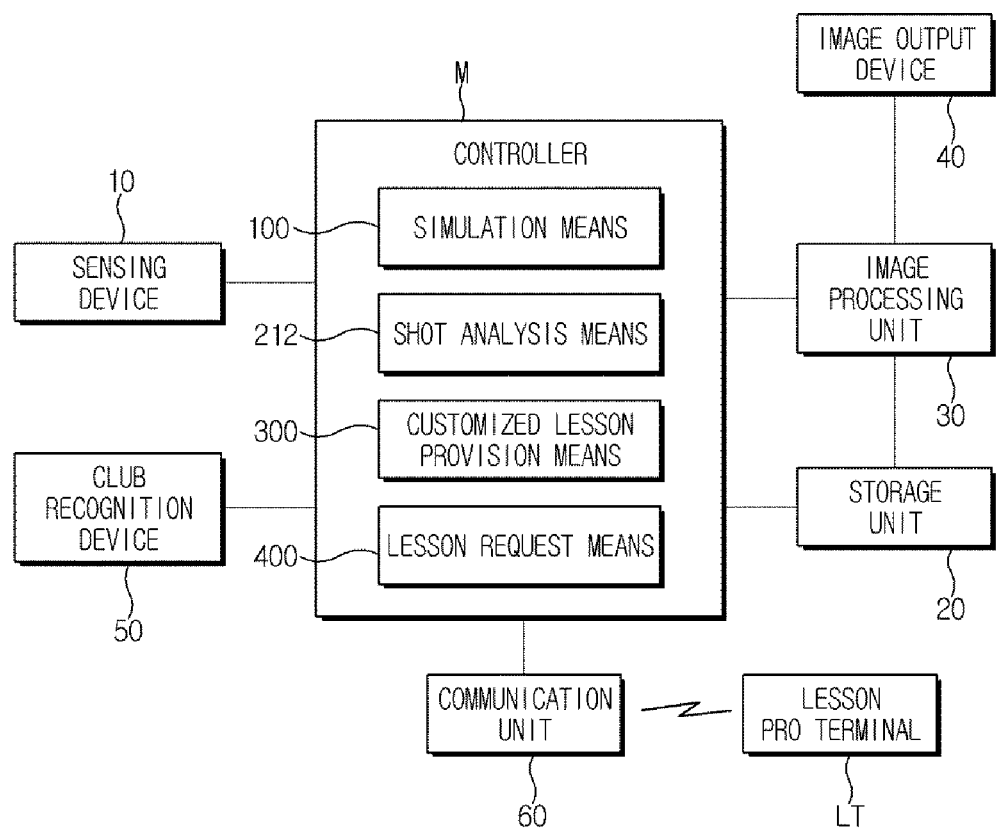
FIGS. 17 and 18 are block diagrams showing the constructions of a virtual golf simulation apparatus according to another embodiment of the present invention and a server.

As shown in FIG. 17, the virtual golf simulation apparatus according to this embodiment of the present invention may include a sensing device 10, a storage unit 20, an image realization means 30 and 40, a club recognition device 50, a communication unit 60, and a controller M.

The sensing device 10, the a storage unit 20, the image realization means 30 and 40, and the club recognition device 50 are substantially identical to those of the virtual golf simulation apparatus shown in FIG. 1, and therefore, a detailed description thereof will be omitted.

Basically, the controller M sets a virtual environment in which a user can take a specific golf shot based on a practice mode selected by the user, image-processes the set virtual environment through the image processing unit 30, and outputs the image-processed virtual environment as an image through the image output device 40.

In this embodiment, the controller M may include a simulation means 100, a shot analysis means 212, a customized lesson provision means 300, and a lesson request means 400.

The virtual golf simulation apparatus according to this embodiment may further include the customized provision means 200 of the embodiment shown in FIG. 1 or may not include the customized provision means 200.

The simulation means 100 presets a plurality of practice modes so that a user can practice a golf shot intensively for each kind of golf shot, and controls the image processing unit 30 and the image output device 40 so that a virtual environment corresponding to a selected practice mode can be realized as an image. That is, the simulation means 100 according to this embodiment is substantially identical in construction to the simulation means 100 according to the embodiment shown in FIG. 1, and therefore, a detailed description thereof will be omitted.

Meanwhile, the shot analysis means 212 analyzes the simulation result of the golf shot taken by the user to determine whether the simulation result corresponds to a preset condition.

The shot analysis means 212 analyzes the simulation result of the golf shot taken by the user for each of a plurality of preset analysis items, and presets information regarding a determination criterion for determining whether the golf shot is good or bad for each analysis item. Whenever the user takes a golf shot, therefore, the shot analysis means 212 determines whether the golf shot is good or bad according to the determination criterion.

The preset condition may be defined with respect to various items. For example, the occurrence of a preset number of bad golf shots taken by a user may be set as a condition.

Also, it is possible for the shot analysis means 212 to differently set information regarding the determination criterion according to skill ranking of the user. A more detailed example of the shot analysis means 212 will be described below.

Meanwhile, in a case in which the analysis result of the user's golf shot by the shot analysis means 212 corresponds to the preset condition (for example, the occurrence of a preset number of bad golf shots taken by a user as the simulation result of the golf shot taken by the user satisfies the preset condition), the customized lesson provision means 300 generates customized lesson content based on the analysis result of the shot analysis means and provides the generated customized lesson content to the user.

That is, the customized lesson provision means 300 extracts information regarding an image of a virtual lesson pro and/or information regarding a voice of the virtual lesson pro and information regarding lesson content based on the analysis result of the shot analysis means from the storage unit 20 to generate the customized lesson content and provides the extracted lesson content as the image and/or the voice of the virtual lesson pro by the generated customized lesson content.

The storage unit 20 may be configured to store information regarding a plurality of virtual lesson pros programmed as having different characteristics, i.e. programmed information regarding ability values of the respective virtual lesson pros and image information and voice information regarding the respective virtual lesson pros. The customized lesson provision means 300 may be realized to extract information regarding a virtual lesson pro selected by the user from among the plurality of virtual lesson pros programmed as having different characteristics from the storage unit 20 and to provide lesson content to the user. Alternatively, the customized lesson provision means 300 may be realized to extract information regarding a virtual lesson pro preset by the system and to provide lesson content to the user.

The virtual lesson pros may have different ability values. For example, on the assumption that a virtual lesson pro A has a relatively low ability value, and another virtual lesson pro A has a relatively high ability value, the virtual lesson pro A may be programmed to provide information regarding general and basic golf lesson content, and the virtual lesson pro B may be programmed to provide information regarding concrete and advanced golf lesson content (for example, golf knowhow of a specific pro golfer) as well as general and basic golf lesson content.

In order to provide lesson content by a specific virtual lesson pro selected from among the plurality of virtual lesson pros, the virtual golf simulation apparatus according to the present invention may further include a lesson pro setting means (not shown) for allowing a user to preset items regarding a virtual lesson pro.

Meanwhile, in a case in which the analysis result of the user's golf shot by the shot analysis means 212 corresponds to the preset condition, the lesson request means 400 may provide an interface, through which the user can request a golf lesson from an offline lesson pro.

When the user executes the interface realized by the lesson request means 400, a golf lesson request signal may be transmitted to a terminal of a lesson pro LT through the communication unit 60. Upon receiving the golf lesson request signal through the lesson pro terminal LT, the lesson pro may personally give a golf lesson to the user.

For example, in a case in which, in a so-called screen golf driving range including a plurality of virtual golf simulation apparatuses according to the present invention, a user performs golf practice through a specific virtual golf simulation apparatus, and, as a preset number of bad golf shots has been taken by the user, the lesson request means 400 outputs the interface for requesting a golf lesson on the screen, a golf less request signal may be transmitted to a terminal of a lesson pro LT residing at the so-called screen golf driving range through the communication unit 60 to call the lesson pro.

At this time, information transmitted through the communication unit 60 may include information regarding the identification number of the virtual golf simulation apparatus used by the user and information regarding analysis of bad golf shots taken by the user.

The lesson pro may confirm from which virtual golf simulation apparatus the golf lesson request signal has been transmitted through the lesson pro terminal LT and may personally give a golf lesson to the user. Also, the lesson pro may receive information regarding analysis of bad golf shots taken by the user through the communication unit 60, and input lesson information regarding the bad golf shots through the lesson pro terminal LT so that the lesson information is transmitted to the communication unit 60. The communication unit 60 may transmit the received lesson information to the virtual golf simulation apparatus used by the user.

The communication between the communication unit 60 and the lesson pro terminal LT may be achieved in a wired communication fashion or in a wireless communication fashion.

Hereinafter, a virtual golf simulation apparatus according to another embodiment of the present invention and a server connected with the virtual golf simulation apparatus through a network will be described in detail with reference to FIG. 18.

The constructions of a sensing device 10, a storage unit 20, an image processing unit 30, an image output device 40, and a club recognition device 50 of the virtual golf simulation apparatus according to this embodiment are substantially identical to those of the embodiment shown in FIG. 17, and therefore, a detailed description thereof will be omitted. Also, basic functions of a simulation means 100, a shot analysis means 212, and a customized lesson provision means 300 of a controller M of the virtual golf simulation apparatus according to this embodiment are substantially identical to those of the embodiment shown in FIG. 17, and therefore, a detailed description thereof will be omitted.

Figure 18:
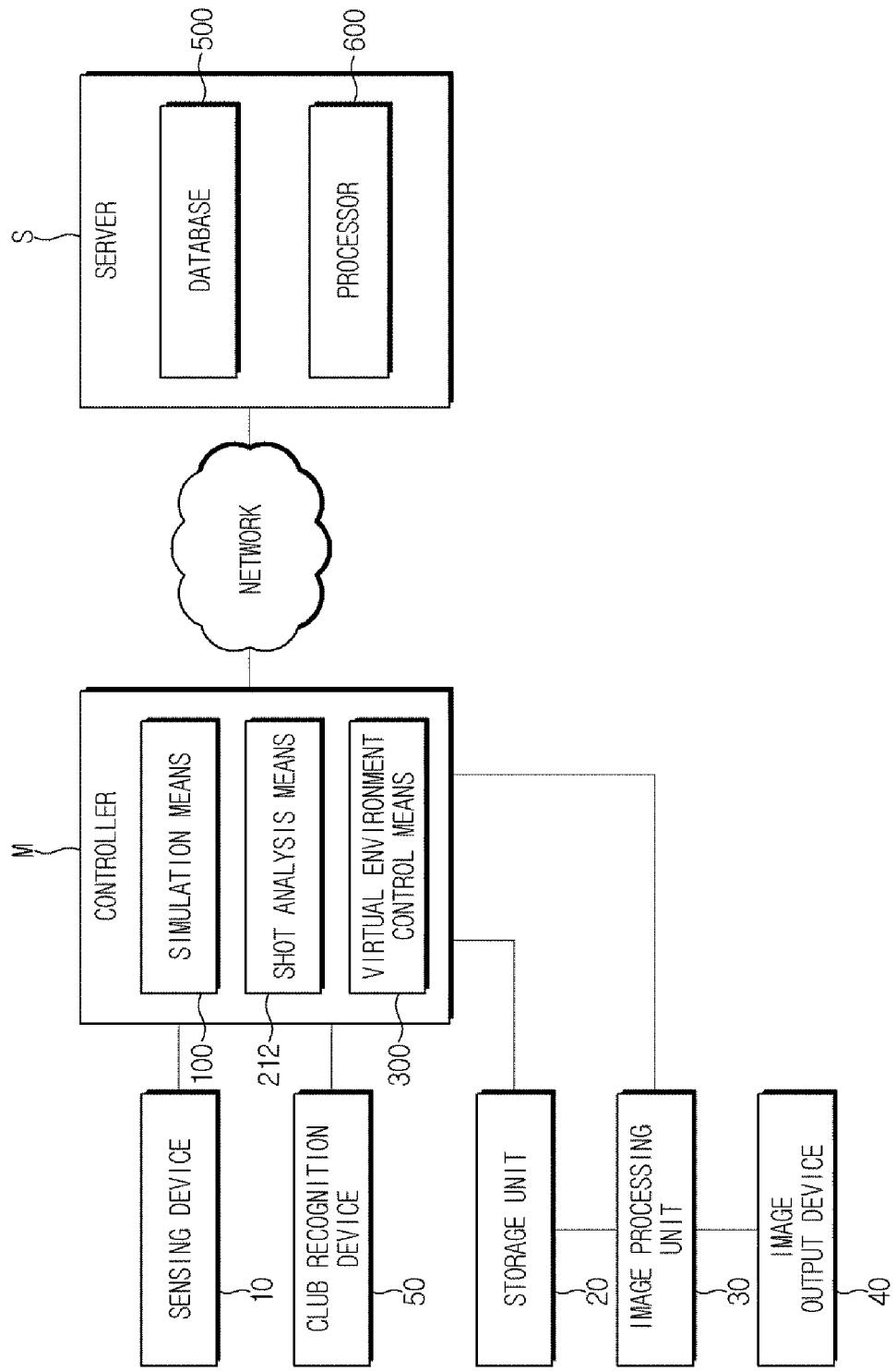

In the embodiment shown in FIG. 18, the server S includes a database 500 and a processor 600.

The database 500 is preferably configured to store identification information of a plurality of virtual golf simulation apparatuses connected to the server S and user information, such as personal information of users registered in the server S, skill ranking information of the users, record information of the user.

Also, the database 500 is preferably configured to store data regarding various kinds of information constituting customized lesson content to be provided by the virtual golf simulation apparatus connected to the server S.

That is, the database 500 may be configured to store information regarding golf lesson content to be provided from the virtual golf simulation apparatus to a user. According to circumstances, the database 500 may store information regarding an image and a voice of a virtual lesson pro. Also, the database 500 may store information necessary for a user to preset a virtual lesson pro, i.e. various kinds of information necessary to set the virtual lesson pro.

In addition, the database 500 may be configured to store information regarding a plurality of virtual lesson pros programmed as having different characteristics (information regarding ability values or images and voices of the respective virtual lesson pros).

Meanwhile, the processor 600 is a component for performing overall functions, such as management and control, of the virtual golf simulation apparatuses connected to the server S. For example, the processor 600 may receive request of information from the virtual golf simulation apparatuses connected to the server S, extract the requested information from the database 500, and transmit the extracted information to the virtual golf simulation apparatuses connected to the server S.

When a user logs in to a virtual golf simulation apparatus, therefore, the processor 600 extracts information regarding the logged in user from the database 500, and transmits the extracted information to the virtual golf simulation apparatus. Consequently, golf simulation is performed in a state in which the user is recognized by the virtual golf simulation apparatus.

The information transmitted from the server S to the virtual golf simulation apparatus includes information regarding skill ranking of the user. When the shot analysis means 212 of the virtual golf simulation apparatus analyzes a golf shot taken by the user, therefore, the information regarding skill ranking of the user may be referred to. For example, in a case in which the shot analysis means 212 determines whether the golf shot taken by the user is good or bad based on a preset determination criterion, a concrete example of which will be described below in detail, the determination criterion may be higher as the skill ranking of the user is higher.

Also, the processor 600 may receive the analysis result of the user's golf shot by the shot analysis means 212 of the virtual golf simulation apparatus, extract information regarding lesson content based on the analysis result from the database 500, and transmit the extracted information to the virtual golf simulation apparatus.

In a case in which the database 500 stores image information or voice information regarding a virtual lesson pro, the processor 600 may extract information regarding golf lesson content to be provided to the user and information regarding the virtual lesson pro who will transmit the lesson content to the user from the database 500, and transmit the extracted information to the virtual golf simulation apparatus.

Upon receiving the information regarding the virtual lesson pro and the information regarding the golf lesson content to be provided to the user from the server S, the customized lesson provision means 300 of the virtual golf simulation apparatus generates customized lesson content to be provided to the user based on the received information, and outputs the customized lesson content to the screen as an image or outputs the customized lesson content as voice with the result that the customized lesson content is provided to the user.

Also, the information regarding the virtual lesson pro may be stored in the storage unit 20 of the virtual golf simulation apparatus. In this case, the processor 600 may transmit information regarding golf lesson content to be provided to the user to the virtual golf simulation apparatus. The customized lesson provision means 300 of the virtual golf simulation apparatus may generate customized lesson content based on the information regarding the virtual lesson pro extracted from the storage unit 20 and the information regarding lesson content received from the server S, and provide the generated customized lesson content to the user.

Hereinafter, items analyzed by the shot analysis means of the golf simulation apparatus according to the present invention and user-customized lesson content provided by the customized lesson provision means will be described in detail with reference to FIGS. 19 to 22.

FIGS. 19 and 20 are views showing a record for each of a plurality of analysis items with respect to the simulation result of golf shots taken by a user through the virtual golf simulation apparatus. Specifically, FIG. 19 shows a record in a case in which the user has taken 5 golf shots using a number 7 iron in a long game practice mode, and FIG. 20 shows a record in a case in which the user has taken an approach shot with a distance of 50 m in a short game practice mode.

As shown in FIG. 19, the shot analysis means analyzes various items, such as a flight distance, a carry, ball speed, club head speed, a smash factor, backspin, sidespin, a ball height, a direction angle, a left and right distance, and a launch angle, with respect to the result of golf shot taken by the user in the long game practice mode. Portions determined to be bad based on a preset determination criterion for determining whether the golf shot is good or bad for each analysis item may be displayed so that the portions determined to be bad can be distinguished from the remaining portions.

The determination criterion for determining whether a golf shot taken by a user is good or bad may be based on an average record of users registered in the system, an average record of users having the same skill ranking as the user, the users being sorted by skill ranking, a record arbitrarily decided by a specialist, such as a pro golfer, or a record arbitrarily decided by the system.

The shot analysis means may compare a record based on the result of the golf shot taken by the user with a preset record according to the determination criterion, and, in a case in which the difference therebetween deviates from a preset range, determine that the golf shot is bad.

For example, in a case in which a record of an average flight distance for each golf club in the skill ranking of the user is preset as the determination criterion, when a flight distance of a golf shot taken by a user using a specific golf club is 10% longer or shorter than the preset average flight distance of the golf club, the shot analysis means may determine that the golf shot is bad.

Also, in a case in which a record of an average left/right direction angle for each golf club in the skill ranking of the user is preset as the determination criterion, when an average direction angle of golf shots taken by a user using a specific golf club is twice or more the preset average direction angle of the golf club, the shot analysis means may determine that the golf shot is bad.

In FIG. 19, an average record is displayed at the upper end thereof, and record items of user's bad golf shots deviating from an allowable range based on the average record are displayed in circles.

Also, in FIG. 20, record items of user's bad golf shots deviating from an allowable range based on the average record are displayed in circles.

The determination criterion may be differently set according to skill ranking of the user.

The shot analysis means may preset an average record of other users as the determination criterion. Also, it is possible to arbitrarily set a specific determination criterion in a virtual environment.

For example, a ball location range in a virtual environment is preset as a determination criterion of an approach shot, and, when an approach shot taken by a user deviates from the preset ball location range by a preset allowable value or more, the shot analysis means may determine that the approach shot is bad.

Also, when the golf shot taken by the user is out of bounds (OB) or is located in a hazard, the shot analysis means may determine that the golf shot is bad.

In a case in which records not reaching the determination criterion of the shot analysis means have occurred for each analysis item, the shot analysis means may determine how many records not reaching the determination criterion have occurred. Upon determining that a preset number of records not reaching the determination criterion have occurred, the shot analysis means may provide a user with customized lesson content through the customized lesson provision means or may call a lesson pro through the lesson request means.

Figure 21:
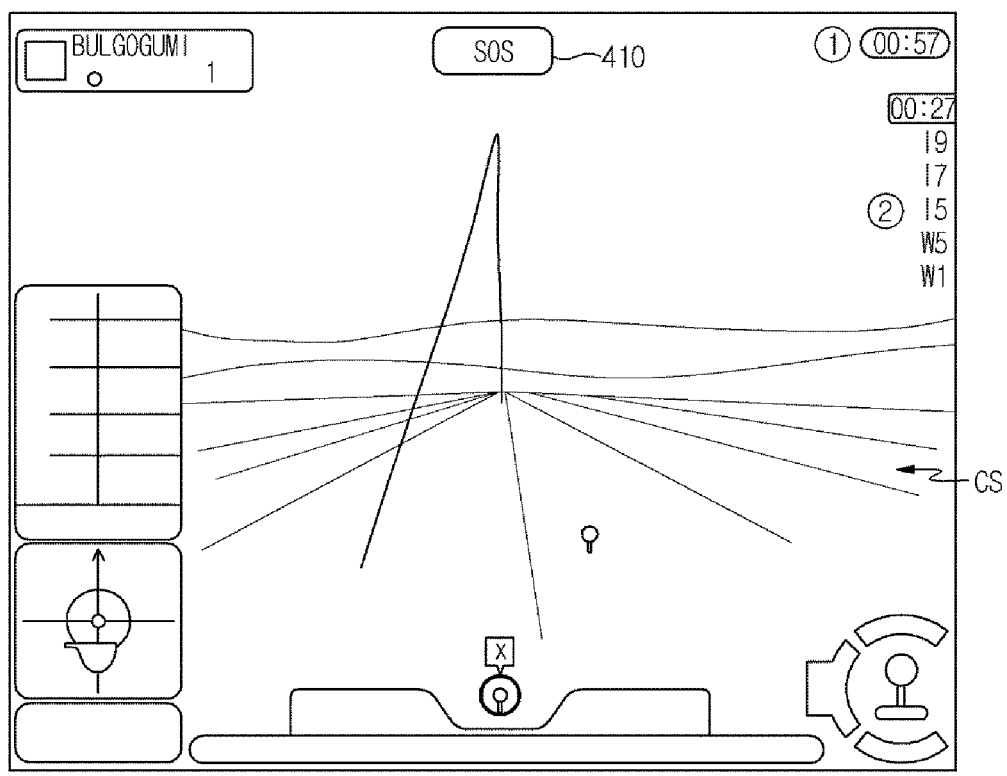

FIG. 21 shows a case in which when a preset number of user's golf shots determined to be bad has occurred, an interface for requesting a golf lesson through the lesson request means is output to a screen.

That is, as shown in FIG. 21, an interface 410 for requesting a golf lesson may be displayed on a golf simulation screen CS. When a user executes the interface, a golf lesson request signal may be transmitted to the lesson pro terminal. Alternatively, information regarding the golf record of the user may be transmitted to the lesson pro terminal.

In addition, the records regarding user's bad golf shots as shown in FIG. 19 or 20 may also be displayed on the screen.

Figure 22:
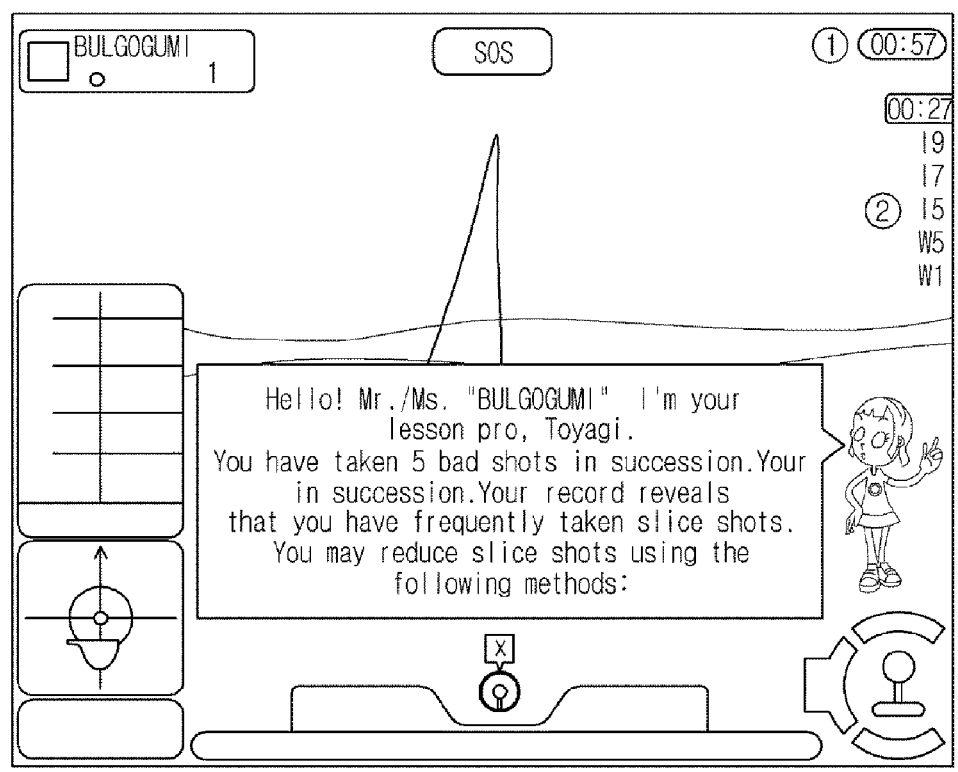

Meanwhile, FIG. 22 shows a case in which when a preset number of user's golf shots determined to be bad has occurred, customized lesson content is output to the screen by the customized lesson provision means.

In an example shown in FIG. 22, golf lesson content based on the analysis result of the golf shot taken by the user is provided through image information and voice information regarding a specific character corresponding to a virtual lesson pro.

For example, in a case in which a record of the golf shot taken by the user has occurred as shown in FIG. 19, and, more particularly, it is determined that a slice golf shot has occurred in terms of the direction angle analysis item, the customized lesson provision means may extract information regarding lesson content for correcting the slice golf shot from the storage unit or may receive information regarding the corresponding lesson content from the server, and may provide the extracted information or the received information.

Although a specific character is set and displayed as a virtual lesson pro in FIG. 22, the present invention is not limited thereto. For example, it is possible to provide lesson content while displaying image and voice information regarding a real lesson pro or pro golfer.

Various characters having different characteristics or real lesson pros or pro golfers may be set as virtual lesson pros. Also, a virtual lesson pro selected by a user from among a plurality of virtual lesson pros or a virtual lesson pro preset by the system according to the skill ranking of the user may provide lesson content.

MODE FOR THE INVENTION

Various embodiments of a virtual golf simulation apparatus for providing a user-customized practice environment, a server connected with the virtual golf simulation apparatus through a network, and a user-customized practice environment provision method using virtual golf simulation according to the present invention have been described in the best mode for carrying out the invention.

INDUSTRIAL APPLICABILITY

In a virtual golf simulation apparatus for providing a user-customized practice environment, a server connected with the virtual golf simulation apparatus through a network, and a user-customized practice environment provision method using virtual golf simulation according to the present invention, it is possible to provide various practice modes for each golf shot so that a user can practice a specific golf shot intensively using golf simulation based on virtual reality to realize a virtual environment that cannot be experienced on a real golf driving range so that the user can intensively practice a golf shot which is more exciting, more intensive, and more practically useful in a real game, in particular, to analyze the record regarding the result of the golf practice performed by the user to set a customized practice curriculum for intensively strengthening user weaknesses, and to realize a virtual environment in which the user can perform golf practice through virtual golf simulation according to the set practice curriculum or to provide customized lesson content to the user, thereby greatly improving golf skill of the user.

The invention claimed is:

1. A virtual golf simulation apparatus for providing a user-customized practice environment, comprising:
   a simulation means for realizing a virtual environment regarding each of a plurality of practice modes preset so that a user can perform golf practice for each kind of golf shot and simulating a trajectory of a ball according to the golf shot taken by the user in the realized virtual environment;
   a set environment control means for controlling the virtual environment so that the user can practice the golf shot according to a set condition in a practice mode set according to practice curriculum setting information for the user set based on an analysis result of a record regarding a result of golf practice performed by the user; and
   a shot analysis means for determining whether the golf shot taken by the user is good or bad according to the practice curriculum setting information.

2. The virtual golf simulation apparatus according to claim 1, further comprising:
   a curriculum setting means for analyzing the record regarding the golf practice result of the user and setting a practice curriculum regarding a practice mode and a practice condition in which the user will practice a golf shot based on the analysis result to generate the practice curriculum setting information, wherein
   the set environment control means realizes a virtual practice environment in which the user can practice the golf shot according to the practice curriculum setting information generated by the curriculum setting means.

3. The virtual golf simulation apparatus according to claim 1, wherein
   the virtual golf simulation apparatus is connected with a server or another terminal through a network, and
   the set environment control means transmits the record regarding the golf practice result of the user to the server or the terminal, receives the practice curriculum setting information generated according to an analysis result of the record from the server or the terminal, and provides the user with a virtual practice environment set based on the practice curriculum setting information.

4. The virtual golf simulation apparatus according to claim 1, wherein the shot analysis means is configured to set a criterion for determining whether the golf shot taken by the user is good or bad based on at least one of an average record of users, a record arbitrarily set by a specialist, and skill ranking of the user.

5. The virtual golf simulation apparatus according to claim 1, wherein the set environment control means allows the user to request correction of the practice curriculum setting information based on the analysis result of the shot analysis means, and, when the user requests the correction of the practice curriculum setting information, corrects the practice curriculum setting information based on the analysis result of the shot analysis means or transmits the practice curriculum setting information to a server or another terminal so that the practice curriculum setting information can be corrected.

6. The virtual golf simulation apparatus according to claim 1, further comprising:
a sensing device for sensing at least one of a golf club and the ball according to a golf swing performed by the user, and a club recognition means for recognizing information regarding a golf club used by the user to take a golf shot, wherein
the simulation means calculates a trajectory of the ball based on a result sensed by the sensing device and information regarding the golf club recognized by the club recognition means so that the ball can be simulated.

7. The virtual golf simulation apparatus according to claim 6, wherein, in a case in which the practice curriculum setting information comprises a set condition regarding kind of a golf club to be used by the user for golf practice, or a set condition regarding a practice distance, the set environment control means is configured to determine whether the golf club recognized by the club recognition means coincides with the golf club according to the set condition and, upon determining that the golf club recognized by the club recognition means coincides with the golf club according to the set condition, to provide a virtual environment according to the practice curriculum setting information.

8. The virtual golf simulation apparatus according to claim 1, further comprising:
a shot analysis means for analyzing the simulation result of the golf shot taken by the user to determine whether the simulation result corresponds to a preset condition; and
a customized lesson provision means for generating customized lesson content based on the analysis result of the shot analysis means and providing the generated customized lesson content to the user or for transmitting the analysis result of the shot analysis means to a server connected with the virtual golf simulation apparatus through a network, receiving information regarding the customized lesson content according to the analysis result of the shot analysis means from the server, and providing the received customized lesson content to the user, in a case in which the simulation result corresponds to the preset condition.

9. The virtual golf simulation apparatus according to claim 1, further comprising:
a shot analysis means for analyzing the simulation result of the golf shot taken by the user to determine whether the simulation result corresponds to a preset condition; and
a lesson request means for providing the interface for requesting a golf lesson in a case in which the simulation result corresponds to the preset condition.

10. A server connected with a virtual golf simulation apparatus for realizing a virtual environment regarding each of a plurality of practice modes preset so that a user can practice a golf shot intensively for each kind of golf shot and simulating a trajectory of a ball according to a sensing result of at least one of a golf club and the ball according to a golf swing performed by the user in the realized virtual environment through a network, the server comprising:
a database for storing information regarding users registered in the server; and
a processor for setting items regarding a practice mode and a practice condition in which the user will practice a golf shot based on a record analysis result according to a result of golf practice performed by the user through the virtual golf simulation apparatus to generate practice curriculum setting information and transmitting the generated practice curriculum setting information to the virtual golf simulation apparatus, wherein
the virtual golf simulation apparatus comprises a shot analysis means for determining whether the golf shot taken by the user is good or bad according to the practice curriculum setting information.

11. The server according to claim 10, wherein the processor comprises a curriculum setting means for receiving the record regarding the golf practice result of the user from the virtual golf simulation apparatus and analyzing the received record or for automatically setting items regarding a practice mode and a practice condition in which the user will practice a golf shot based on the analysis result to generate the practice curriculum setting information.

12. The server according to claim 10, wherein
the server is configured to be connected with a specialist terminal through a network, and
the processor is configured to receive the record regarding the golf practice result of the user from the virtual golf simulation apparatus, transmit the received record or a record regarding the user stored in the database to the specialist terminal, and transmit the practice curriculum setting information set for the user to the virtual golf simulation apparatus through the specialist terminal.

13. A user-customized practice environment provision method using virtual golf simulation, comprising:
extracting a record regarding a result of golf practice performed by a user and analyzing the record through a virtual golf simulation apparatus for realizing a virtual environment regarding each of a plurality of practice modes preset so that the user can practice a golf shot intensively for each kind of golf shot;
setting items regarding a practice mode and a practice condition in which the user will practice a golf shot based on the analysis result of the record to generate practice curriculum setting information for the user; and
controlling a virtual golf simulation environment so that the user can practice the golf shot according to a set condition in a practice mode set according to the practice curriculum setting information, wherein
the step of analyzing the record comprises analyzing the simulation result of the golf shot taken by the user, and the user-customized practice environment provision method further comprises:

determining whether the simulation result corresponds to a preset condition; and upon determining that the simulation result corresponds to the preset condition, generating customized lesson content based on the analysis result and providing the generated customized lesson content to the user or transmitting the analysis result to a server connected with the virtual golf simulation apparatus through a network, receiving information regarding the customized lesson content from the server, and providing the received customized lesson content to the user.

14. The user-customized practice environment provision method according to claim 13, wherein the step of analyzing the record comprises transmitting the record regarding the golf practice result to a server connected with the virtual golf simulation apparatus through a network and analyzing the record at the server, and the step of generating the practice curriculum setting information setting items regarding a practice mode and a practice condition in which the user will practice a golf shot based on the analysis result of the record to generate the practice curriculum setting information and transmitting the generated practice curriculum setting information to the virtual golf simulation apparatus.

15. The user-customized practice environment provision method according to claim 13, wherein the step of analyzing the record comprises transmitting the record regarding the golf practice result to a server connected with the virtual golf simulation apparatus through a network and transmitting the record from the server to a terminal of a specialist so that the record can be analyzed by the specialist, and the step of generating the practice curriculum setting information setting items regarding a practice mode and a practice condition for the user based on the analysis result of the record through the specialist terminal to generate the practice curriculum setting information and transmitting the generated practice curriculum setting information to the virtual golf simulation apparatus.

16. The user-customized practice environment provision method according to claim 13, wherein the step of controlling the virtual golf simulation environment comprises executing a practice mode selected from among a plurality of practice modes or some practice modes selected from among the plurality of practice modes in set order according to the practice curriculum setting information.

17. The user-customized practice environment provision method according to claim 13, wherein the practice curriculum setting information comprises at least one selected from among setting information regarding kind of a practice mode in which the user will perform golf practice, setting information regarding execution order of a plurality of practice modes, setting information regarding practice time, setting information regarding kind of a golf club to be used for golf practice, setting information regarding a flight distance for golf practice, setting information regarding a goal record, and setting information regarding a virtual environment in which the user will perform golf practice.

18. The user-customized practice environment provision method according to claim 13, wherein the determining step comprises:

analyzing the simulation result of the golf shot taken by the user for each of a plurality of preset analysis items;

determining whether the golf shot taken by the user is good or bad as the analysis result for each of the analysis items according to a preset determination criterion; and determining whether a preset number of bad shots have been taken by the user for at least one of the analysis items to determine whether the condition is satisfied.

* * * * *